US011087293B1

(12) United States Patent
Yan

(10) Patent No.: US 11,087,293 B1
(45) Date of Patent: Aug. 10, 2021

(54) BLOCKCHAIN BASED BANK CHECKING NETWORK WITH PAPER CHECKING ENHANCEMENTS

(71) Applicant: TraDove, Inc., Palo Alto, CA (US)

(72) Inventor: Jun Yan, Palo Alto, CA (US)

(73) Assignee: TraDove, Inc., Palo Alto, CA (US)

( * ) Notice: Subject to any disclaimer, the term of this patent is extended or adjusted under 35 U.S.C. 154(b) by 0 days.

(21) Appl. No.: 17/024,632

(22) Filed: Sep. 17, 2020

Related U.S. Application Data

(63) Continuation-in-part of application No. 16/826,080, filed on Mar. 20, 2020.

(51) Int. Cl.
*G06Q 20/04* (2012.01)
*G06Q 20/32* (2012.01)
*G06Q 20/36* (2012.01)
*G06Q 20/40* (2012.01)
*G06Q 20/06* (2012.01)
*G06Q 20/38* (2012.01)
(Continued)

(52) U.S. Cl.
CPC ....... *G06Q 20/042* (2013.01); *G06K 7/10861* (2013.01); *G06K 7/1417* (2013.01); *G06Q 20/0655* (2013.01); *G06Q 20/204* (2013.01); *G06Q 20/326* (2020.05); *G06Q 20/3223* (2013.01); *G06Q 20/3276* (2013.01); *G06Q 20/3672* (2013.01); *G06Q 20/3674* (2013.01); *G06Q 20/389* (2013.01); *G06Q 20/3825* (2013.01); *G06Q 20/4037* (2013.01); *G06Q 20/40145* (2013.01); *G06Q 40/02* (2013.01); *H04L 9/32* (2013.01); *G06K 2007/10504* (2013.01); *G06Q 20/0425* (2013.01); *G06Q 2220/00* (2013.01)

(58) Field of Classification Search
CPC .................................................. G06Q 20/042
See application file for complete search history.

(56) References Cited

U.S. PATENT DOCUMENTS 10,423,938 B1 * 9/2019 Gaeta ................. G06Q 20/4016
2017/0278080 A1 * 9/2017 Kruszka ............. H04N 1/32144
(Continued)

FOREIGN PATENT DOCUMENTS

GB         2459548 A  * 11/2009  ............. G06Q 20/02

*Primary Examiner* — Jacob C. Coppola
(74) *Attorney, Agent, or Firm* — Sheppard Mullin Richter & Hampton LLP

(57) ABSTRACT

A system includes processors and instructions that, when executed by the one or more processors, cause the system to perform operations of receiving a blockchain check request from a first network participant, generating a paper blockchain check including a QR code, issuing the paper blockchain check to the first network participant, obtaining an image of the issued paper blockchain check, determining whether the bank account associated with the first network participant has access to a sufficient amount of funds, associating the designated amount of funds and the identifier of an intended recipient with the QR code, locking funds in the first network participant's bank account, generating, upon the intended recipient being validated with the blockchain, a digital blockchain check based on details associated with the scanned QR code, and disabling the paper blockchain check after the conversion of the paper blockchain check into the digital BC check.

20 Claims, 12 Drawing Sheets

(51) Int. Cl.
*G06Q 20/20* (2012.01)
*G06K 7/14* (2006.01)
*G06K 7/10* (2006.01)
*H04L 9/32* (2006.01)
*G06Q 40/02* (2012.01)

(56) References Cited

U.S. PATENT DOCUMENTS

| | | | |
|---|---|---|---|
| 2019/0340584 A1* | 11/2019 | Arora | G06K 7/1417 |
| 2020/0097924 A1* | 3/2020 | Arora | G06Q 20/40 |
| 2020/0118073 A1* | 4/2020 | Phillips | G06Q 20/3829 |
| 2020/0160286 A1* | 5/2020 | Vukich | G06Q 20/0425 |
| 2020/0184460 A1* | 6/2020 | Gatchalian | G06K 19/0723 |

* cited by examiner

BLOCKCHAIN BASED BANK CHECKING NETWORK WITH PAPER CHECKING ENHANCEMENTS

CROSS REFERENCE TO RELATED APPLICATION

This application is a continuation-in-part of U.S. patent application Ser. No. 16/826,080, filed Mar. 20, 2020, the content of which is incorporated by reference in its entirety into the present disclosure.

TECHNICAL FIELD

This disclosure relates to blockchain transaction networks, and more specifically some embodiments disclosed herein relate to blockchain solutions to enable issuing, writing, exchanging, tracing, re-using, authenticating, validating and cashing of blockchain based checks (hereinafter, "BC checks").

BACKGROUND

A blockchain is generally understood to be a distributed ledger comprising a growing list of records (i.e., blocks) that are linked together (in a chain-like fashion) using cryptography. A blockchain can record transactions between parties in a verifiable, permanent manner that is resistant to data modifications. Electronic transactions that take place on a blockchain supported transaction network can provide enhanced transparency, security, validation, and traceability benefits as compared to traditional transaction networks. Blockchain supported transaction networks utilize such a decentralized digital ledger to record all transactions occurring within the network into blocks that are successively linked together using cryptography. Typically, each subsequent block in the chain includes a cryptographic hash of the previous block. In blockchain systems, often the entire ledger (including all transactions that have occurred within the network) is distributed to all the nodes in the network. The ledger is said to be immutable and transparent. In such systems, the blockchain cannot be altered without first obtaining consensus for the change.

While blockchain supported transaction networks give rise to numerous benefits over traditional transaction networks, these networks still preclude, or have not yet developed, the use of various forms of payment (including certain legacy forms of payment, or acceptable solutions for such forms of payment). Said differently, solutions for enabling the use of various forms of payment have not been developed and integrated into blockchain supported transaction networks. One such form of payment includes checks. The use of traditional checks is still prevalent, particularly in the United States, and accounts for a considerable volume of payments made every day. But no workable blockchain based checking solution has been presented or developed. The present disclosure provides practical systems, methods, architectures, and coordinated communication procedures to enable novel blockchain based checking solutions that enjoy various benefits of blockchain supported transactions. In some implementations, the present disclosure provides solutions for providing a token based checking solution supported by a blockchain to effectively replace the conventional check writing, validation and cashing of checks over traditional networks.

SUMMARY

Claimed solutions are rooted in computer technology to overcome problems specifically arising in the realm of computer technologies used in transaction networks—e.g., (i) a double-spend problem in blockchain supported transaction networks, (ii) a problematic validation procedure that causes time-to-clearing issues when traditional checks are used, (iii) a fraud/security problem when traditional checks are used, (iv) a cashing efficiency problem with traditional checks, among others. Such solutions comprise blockchain supported transaction networks, together with blockchain based checks (hereinafter, "BC checks") and related processes and features. Among the many benefits of the present disclosure, the BC check technology of the present disclosure introduces a significant breakthrough in check clearing and cashing processes. This breakthrough technology avoids the typically time-intensive and resource-consuming "check clearing" process that plagues traditional checking technologies.

In some embodiments, such BC checking systems and methods involve receiving a BC check request from a first network participant, the BC check request indicating the intended recipient of the BC check and the amount of funds to be redeemable by the intended recipient upon redeeming a BC check generated based on the request; determining whether the digital wallet of the first network participant has access to a sufficient amount of funds to ensure that the recipient network participant's ability to redeem the BC check for fiat currency at a financial institution associated with the first network participant; generating, in response to determining that sufficient funds exist to support issuance of the BC check, the BC check based on the BC check request, wherein the generated BC check may be transmittable from one digital wallet to another; transmitting the BC check from a digital wallet associated with the first network participant to a digital wallet associated with the recipient network participant; transmitting the BC check and bank info (e.g. account or international bank account number ("iban" number), routing number, Swift code, and the like) from the digital wallet of the node associated with the recipient network participant to a financial institution associated with the first network participant (or a node associated therewith); and/or transferring, upon request to cash the BC check at the financial institution associated with the first network participant, an amount of fiat currency corresponding to the amount designated by the BC check from the first network participant's account at the financial institution associated with the first network participant to the recipient network participant's account at the financial institution associated with the recipient network participant.

In some embodiments, such systems and methods involve locking, upon generating the BC check, fiat currency and/or digital currency in the first network participant's bank account(s), wherein the amount of digital or fiat currency locked corresponds to the amount of digital or fiat currency designated by the BC check. Locking a digital currency may involve restricting the transferability of the digital or fiat currency (e.g., until the BC check has been cashed or terminated).

In some embodiments, such systems and methods involve determining a time at which the BC check expires; terminating the BC check after the time at which the BC check expires.

In some embodiments, such systems and methods involve transmitting deposit account information of the recipient network recipient to the financial institution associated with the first network participant.

In some embodiments, such systems and methods involve authenticating the first network participant and the recipient network participant without requiring authentication of the first network participant and the recipient network participant by the financial institution associated with the recipient network participant. In some environments, the financial institution associated with the first network participant and the recipient network participant are different financial institutions, where in other environments they may be the same. In some embodiments the financial institution associated with the first network participant is associated with a network node comprising the financial institution's digital wallet. Similarly, the financial institution associated with the recipient network participant is associated with a network node comprising the digital wallet of the financial institution associated with the recipient network participant.

In some embodiments, the systems and methods may involve: receiving a BC check request from a first network participant (the BC check request indicating the intended recipient of the BC check and the amount of funds to be redeemable by the intended recipient upon redeeming a BC check generated based on the request), wherein the amount of funds includes one or more of an amount of digital currency (i.e., central bank digital currency) and an amount of fiat-currency; and/or determining whether the bank account of the first network participant has access to a sufficient amount of funds to ensure that the recipient network participant's ability to redeem the BC check for fiat currency at a financial institution associated with the first network participant; and/or generating, in response to determining that sufficient funds exist to support issuance of the BC check, the BC check based on the BC check request, wherein the generated BC check is transmittable from one digital wallet to another; and/or transmitting the BC check from a digital wallet associated with the first network participant to a digital wallet associated with the recipient network participant; and/or transmitting the BC check from the digital wallet of the node associated with the recipient network participant to a financial institution associated with the first network participant; and/or transmitting bank account information of the recipient network participant to the financial institution associated with the first network participant, wherein the bank account information includes one or more of an account number, an international bank account or IBAN number, a SWIFT code, and a routing number; and/or transferring, upon request to cash the BC check at the financial institution associated with the first network participant, an amount of fiat currency corresponding to the amount designated by the BC check from the first network participant's bank account at the financial institution associated with the first network participant to the recipient network participant's bank account at the financial institution associated with the recipient network participant.

In some embodiments, systems and/or methods of the present disclosure involve one or more of: receiving a BC check request from a first network participant (e.g., a payer), the BC check request indicating one or more of (1) an intended recipient (e.g., a payee) of the BC check, (2) a designated amount of funds, (3) and a bank account associated with the first network participant; and/or determining whether the bank account associated with the first network participant has access to a sufficient amount of funds to ensure the intended recipient's ability to redeem a BC check generated based on the BC check request for the designated amount of funds; and/or causing, in response to determining that the sufficient amount of funds exists, a paper BC check to be generated based on the BC check request, the generated paper BC check including a unique QR code associated with a check-specific detail (the check specific detail may include one or more of: a check number, a link to a downloadable digital wallet application; and/or the designated amount of funds, an identifier associated with one or more of the first network participant and the intended recipient, an address associated with one or more of the first network participant and the intended recipient, a wallet ID associated with one or more of the first network participant and the intended recipient, a bank account detail associated with one or more of the first network participant and the intended recipient (where a bank account detail may include one or more of: an account number, an international bank account number, a swift code, and a routing number)); and/or locking, upon generating the paper BC check, an amount of funds in the first network participant's bank account, the amount of funds locked being based upon the designated amount of funds (where locking imposes usability restrictions on one or more of digital currency and fiat currency in the first network participant's bank account corresponding to the amount of funds); and/or causing the generated paper BC check to be issued to the first network participant; and/or notifying a blockchain that that the paper BC check has been one or more of generated and issued, and optionally notifying the blockchain of one or more of the check-specific details; and/or scanning, by a device associated with the intended recipient and after the first network participant has presented the intended recipient with the paper BC check, the QR code from the paper BC check; and/or obtaining one or more of the check-specific details based on the QR code scanned from the paper BC check; and/or generating, upon the intended recipient being validated with the blockchain, a digital BC check based on the check-specific details obtained from the unique QR code scanned from the paper BC check; and/or disabling the paper BC check after the conversion of the paper BC check into the digital BC check.

In some embodiments, systems and/or methods of the present disclosure may involve one or more of: transmitting the digital BC check from the digital wallet of the node associated with the intended recipient to a financial institution associated with the first network participant; and/or transmitting one or more of the obtained check-specific details to the financial institution associated with the first network participant; and/or transferring, based on the one or more check-specific details, the designated amount of funds from the bank account at the financial institution associated with the first network participant to the bank account at the financial institution associated with the intended recipient.

In some embodiments, systems and/or methods of the present disclosure may involve one or more of: transmitting, upon selection by the intended recipient, the digital BC check from a digital wallet associated with the intended recipient to a digital wallet associated with a second recipient network participant; and/or notifying the blockchain that the paper BC check issued to the first network participant has been converted into a digital BC check by the digital wallet associated with the intended recipient.

In some embodiments, systems and/or methods of the present disclosure may involve one or more of: determining whether the intended recipient is a member of a blockchain network associated with the first network participant's financial institution; and/or presenting, if it is determined that the intended recipient is not a member of the blockchain network and in response the intended recipient scanning the QR code of the paper BC check, the intended recipient with an option to download a digital wallet application and register as a member of the blockchain network; and/or causing, upon selection of the option presented to the intended recipient, the digital wallet application to be downloaded to the intended recipient's device; and/or permitting, upon download of the digital wallet application to the intended recipient's device, the intended recipient to register as a member of the blockchain network for purposes of redeeming the digital BC check.

In some embodiments, systems and/or methods of the present disclosure involve one or more of: receiving a BC check request from a first network participant (e.g., a payer), the BC check request indicating at least: and a bank account associated with the first network participant; and/or generating a paper BC check including a unique QR code, a blank field wherein the first network participant may write-in a designated amount of funds, and a blank field wherein the first network participant may write-in an identifier of an intended recipient (e.g., a payee) of the designated amount of funds (where the QR code may be associated with one or more of: a check number, a link to a downloadable digital wallet application, an identifier associated with the first network participant, an address associated with the first network participant, a wallet ID associated with the first network participant, a bank account detail associated with the first network participant; and/or where a bank account detail may include one or more of: an account number, an international bank account number, a swift code, and a routing number); and/or issuing the paper BC check to the first network participant; and/or obtaining, after the first network participant writes in the designated amount of funds and the identifier of an intended recipient, an image of the issued paper BC check (where the identifier of the intended recipient may be associated with one or more of a wallet ID, an address, an account number, an international bank account number, a swift code, and a routing number); and/or determining whether the bank account associated with the first network participant has access to a sufficient amount of funds to ensure the intended recipient's ability to redeem the paper BC check; and/or causing, in response to determining that the sufficient amount of funds exists, the designated amount of funds and the identifier of the intended recipient to become associated with the QR code; and/or locking, upon associating the designated amount of funds with the QR code of the paper BC check, an amount of funds in the first network participant's bank account, the amount of funds locked being based upon the designated amount of funds (where locking may impose usability restrictions on one or more of digital currency and fiat currency in the first network participant's bank account corresponding to the amount of funds); and/or notifying the first network participant that the paper BC check is transferrable to the intended network participant; and/or notifying a blockchain that the paper BC check has been one or more of generated, written, and issued, and optionally notifying the blockchain of one or more of the designated amount of funds and the identifier of the intended recipient; and/or scanning, by a device associated with the intended recipient and after the first network participant has presented the intended recipient with the paper BC check, the QR code from the paper BC check; and/or obtaining details associated with QR code based on the scanning of the paper BC check; and/or generating, upon the intended recipient being validated with the blockchain, a digital BC check based on the details associated with the scanned QR code; and/or disabling the paper BC check after the conversion of the paper BC check into the digital BC check.

In some embodiments, systems and/or methods of the present disclosure may involve one or more of: transmitting the digital BC check from the digital wallet of the node associated with the intended recipient to a financial institution associated with the first network participant; and/or transmitting one or more of the details associated with the scanned QR code to the financial institution associated with the first network participant; and/or transferring, based on the one or more details associated with the scanned QR code, the designated amount of funds from the bank account at the financial institution associated with the first network participant to the bank account at the financial institution associated with the intended recipient.

In some embodiments, systems and/or methods of the present disclosure may involve one or more of: transmitting, upon selection by the intended recipient, the digital BC check from a digital wallet associated with the intended recipient to a digital wallet associated with a second recipient network participant.

In some embodiments, designated amount of funds includes one or more of an amount of digital currency and an amount of fiat-currency.

In some embodiments, an intended recipient is validated with the blockchain by performing an authorization operation, wherein the authorization operation includes an evaluation of at least one of: a handwriting sample, a handwritten signature, a digital signature, and a biometric measurement.

In some embodiments, the scanning is performed by a scanner, which may include one or more of a camera, an RFID reader, and infrared imaging device, or any other transducer and/or receiver subsystem associated with the device of the intended recipient.

In some embodiments, the scanner associated with the device of the intended recipient is embodied in a point-of-sale device. In some embodiments, the scanner associated with the device of the intended recipient is embodied within the device of the intended recipient.

In some embodiments, systems and/or methods of the present disclosure may involve one or more of: determining whether the intended recipient is a member of a blockchain network associated with the first network participant's financial institution; and/or presenting, if it is determined that the intended recipient is not a member of the blockchain network and in response the intended recipient scanning the QR code of the paper BC check, the intended recipient with an option to download a digital wallet application and register as a member of the blockchain network; and/or causing, upon selection of the option presented to the intended recipient, the digital wallet application to be downloaded to the intended recipient's device; and/or permitting, upon download of the digital wallet application to the intended recipient's device, the intended recipient to register as a member of the blockchain network for purposes of redeeming the digital BC check.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Figure 1A:
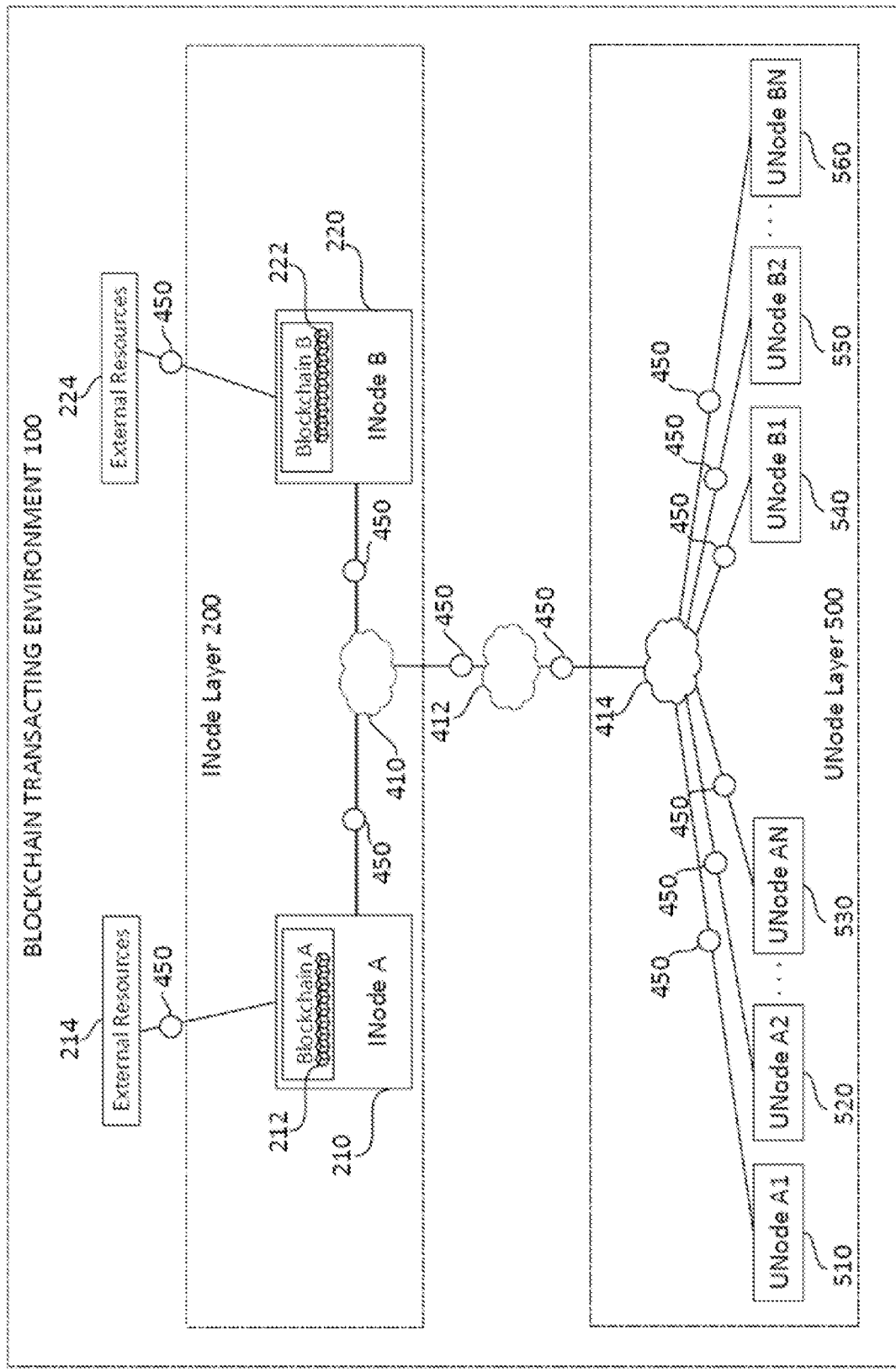
FIG. 1A illustrates one or more elements of an example blockchain network environment in accordance with one or more embodiments of the present disclosure.

FIG. 1A is a diagram illustrating an example blockchain transacting environment 100 (also referred to herein as a blockchain supported transaction network) in which one or more embodiments of the present disclosure may be implemented. Blockchain transacting environment 100 may include a plurality of nodes in communication with one another over one or more networks 410, 412, and/or 414 via communication links 450. A "node" refers to any device that participates in a blockchain supported transaction network. A node may host all or part of a blockchain, or no portion of a blockchain at all. However, in general a node of the blockchain network has access (periodically, continuously, upon selection, upon approval, or upon request) to at least one other node that hosts all or part of a blockchain for purposes of, directly or indirectly validating, signing (e.g., endorsing), approving, authenticating, clearing, cashing, processing, and/or recording of transactions, for providing various notices in connection with a transaction, among other actions.

A node can comprise or be coupled with any active or activatable electronic device, such as, by way of example, laptop or desktop computers, smartphones, smartwatches, personal digital assistants, servers, tablets, netbooks, or even printers and other simple electronic devices. Nodes are coupled to or equipped with wired or wireless communication components allowing them to connect to and communicate with (i) other nodes, such as, by way of example, communication with other nodes over one or more networks 410, 412, and/or 414 (e.g., over the Internet using an Ethernet, Wi-Fi, or Cellular connection, for example) and/or (ii) other devices or resources, such as, by way of example, communication with external resources 214, 224 (e.g., over the Internet using an Ethernet, Wi-Fi, or Cellular connection, for example).

Communication links 450 may connect nodes and/or other resources within blockchain transacting environment 100 to one or more networks 410, 412, and/or 414, and thereby to each other. Communication links 450 may be dynamically reconfigurable such that one or more nodes and/or other resources may be newly connected to or removed from the blockchain transacting environment 100 as the network evolves with new and/or different participants, and new and/or different resources. Communication links 450 may include any type of link. For example, one or more links 450 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), optical (such as for example Synchronous Optical Network (SONET) or Synchronous Digital Hierarchy (SDH)) links, or any one or more of an ad hoc network, an intranet, an extranet, a VPN, a LAN, a WLAN, a WAN, a WWAN, a MAN, a portion of the Internet, a portion of the PSTN, a cellular technology-based network link, a satellite communications technology-based network link, another link 450, or a combination of two or more such links 450. Links 450 need not be the same throughout blockchain transacting environment 100. Indeed, one or more first links 450 may differ in one or more respects from one or more second links 450. Communication over links 450 may include any request to send or receive any type of information accessible within blockchain transacting environment 100.

Networks 410, 412, and/or 414 may include any type of communication network. As an example and not by way of limitation, one or more portions of network 400 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these.

As further shown in FIG. 1A, the nodes of blockchain transacting environment 100 include multiple user nodes (UNode A1 510, UNode A2 520, . . . UNode AN 530 and UNode B1 540, UNode B2 550, . . . UNode BN 560) communicatively coupled with one or more identity nodes, INodeA 210, INodeB 220, the INodes being further communicatively coupled with one or more external resources 214, 224.

An INode (i.e., an "identity node") of INode layer 200 is a node that is associated with a network participant operating as (1) a centralized identity verification/account management entity with which, optionally, other network participants may hold accounts, be members, or otherwise be registered, and/or (2) a financial institution such as, a bank, a credit union, etc. (e.g., Chase Bank, Wells Fargo) with which, optionally, other network participants may hold accounts, be members, or otherwise be registered, and/or (3) a network of one or more centralized identity verification/account management entities and/or one or more financial institutions; and/or (4) a network of one or more identity verification/account management entities and/or one or more financial institutions.

An INode may, alone or together with other INodes host a blockchain. For example, as depicted in FIG. 1A, INode A 210 hosts blockchain A 212, and INode B 220 hosts blockchain B 222. In some examples, INode A 210 may maintain a blockchain in connection with any transaction involving the INode A 210 and/or any UNode for which INode A 210 either holds an account such as a bank account (e.g., transactions involving any one or more of UNode A1 510, UNode A2 520, . . . UNode AN 530), and/or any UNode that has established a non-account holding membership with INode A 210 for validation, signature (e.g., endorsing), approving, authenticating, clearing, cashing, processing, recording, and notification purposes (e.g., transactions involving any one or more of UNode B1 540, UNode B2 550, . . . UNode BN 560, to the extent the same are registered with INode A 210 (e.g., as non-account holding members)). Similarly, INode B 220 may maintain a blockchain in connection with any transaction involving the INode B 220 and/or any UNode for which INode B 220 holds an account (e.g., transactions involving any one or more of UNode B1 540, UNode B2 550, . . . UNode BN 560), and/or any UNode that has established a non-account holding membership with INode B 220 for validation, signature (e.g., endorsing), approving, authenticating, clearing, cashing, processing, recording, and notification purposes (e.g., transactions involving any one or more of UNode A1 510, UNode A2 520, . . . UNode AN 530, to the extent the same are registered with INode B 220 (e.g., as non-account holding members)).

Figure 1B:
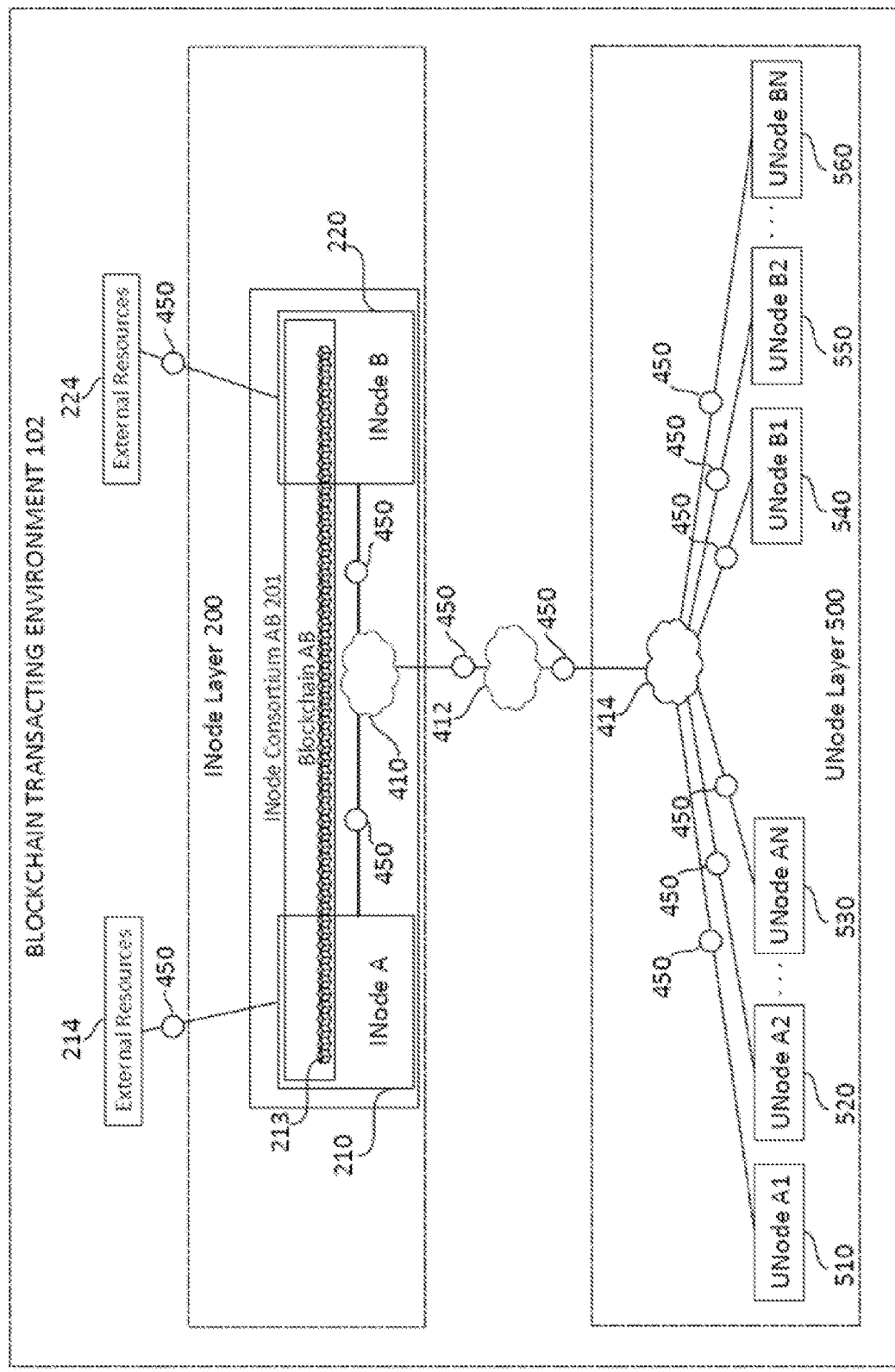
FIG. 1B illustrates one or more elements of another example blockchain network environment in accordance with one or more embodiments of the present disclosure.
Figure 1C:
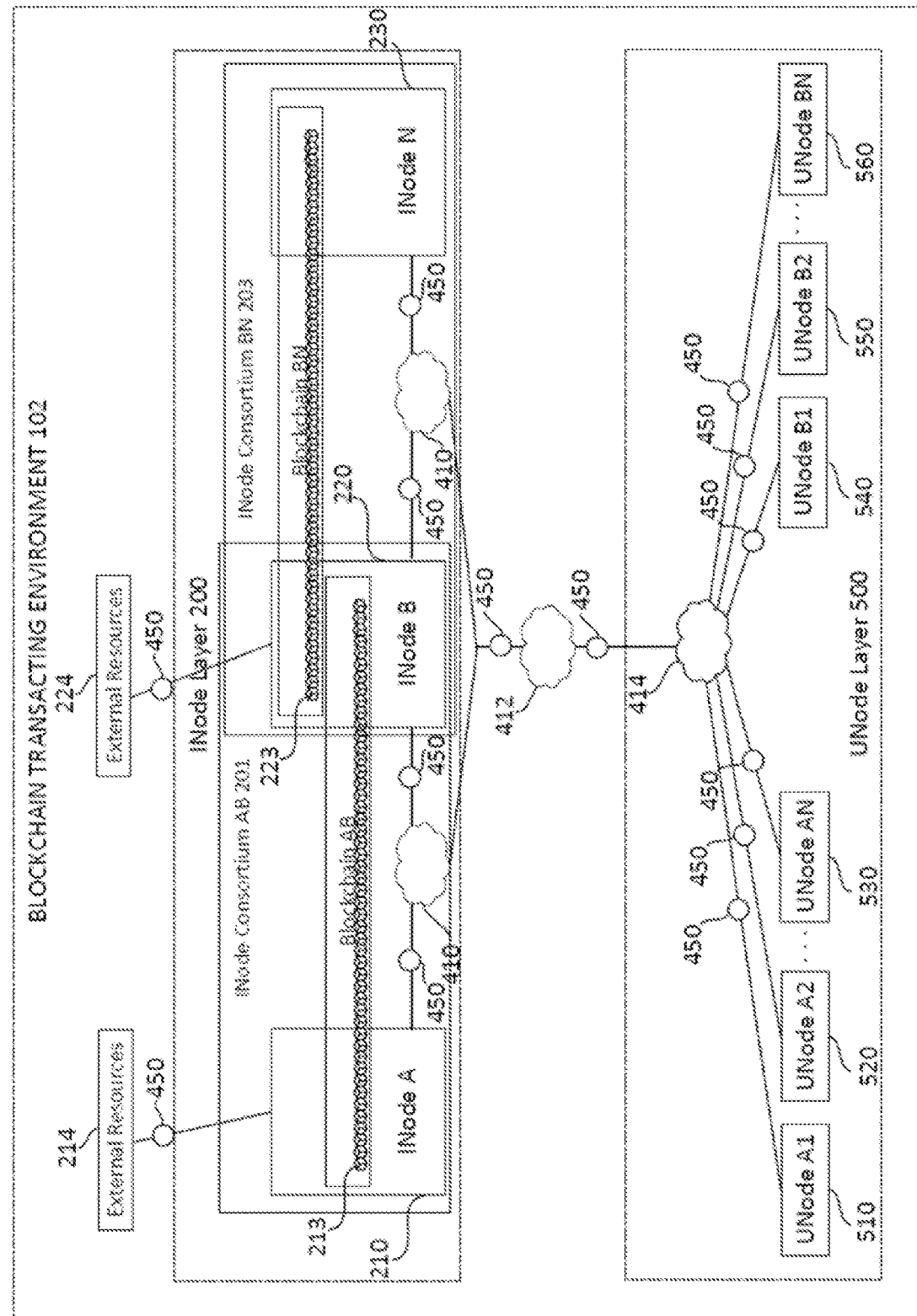
FIG. 1C illustrates one or more elements of another example blockchain network environment in accordance with one or more embodiments of the present disclosure.

Additionally or alternatively, a group of INodes may form an INode Consortium. An INode Consortium may maintain a blockchain in connection with any transaction involving any one or more of the INodes within the group and/or any UNode for which any one or more of the INode holds an account, and/or any UNode that has established a non-account holding membership with one or more of the INodes within the group for validation, signature (e.g., endorsing), approving, authenticating, clearing, cashing, processing, recording, and notification purposes. That is, instead of or in addition to INode_A 210 and INode_B 220 hosting separate blockchains (blockchain_A 212 and blockchain_B 222), INode_A 210 and INode_B 220 may coordinate and arrange to host a single blockchain in connection with any transaction involving either INode_A or INode_B and/or any of their respective account holding and/or non-account holding members (e.g., transactions involving any one or more of UNode_A1 510, UNode_A2 520, . . . UNode_AN 530, UNode_B1 540, UNode_B2 550, . . . UNode_BN 560). Such a scenario is illustrated in FIG. 1B (discussed below). Similarly, any number of INodes may form a consortium that coordinates and arranges to host a single blockchain in connection with transactions involving any of the INodes within the consortium and/or any of their respective member UNodes. That is, a given blockchain transacting environment may include multiple INodes and/or INode consortiums. In some embodiments, a single INode may be party to multiple consortiums. FIG. 1C (discussed below) depicts such a scenario. It should also be appreciated from the present disclosure that a given blockchain transacting environment may include one or more INodes operating on their own (hosting their own blockchains), and may at the same time include other INodes operating as an INode consortium (together hosting a single blockchain).

A UNode (i.e., a "user node") of UNode layer 500 is a node that is associated with a network participant (e.g., a business, an organization, an institution, a person, an entity, or other user) within the blockchain transacting environment 100. Individual UNodes 500 may be embodied in one or more computer systems associated with individual network participants, where network participants are entities registered with blockchain transacting environment 100, and who may, upon satisfying requirements, participate in transactions with other network participants on a transaction network supported by the blockchain transacting environment 100 (e.g., potential payers and potential payees).

For example, each INode depicted in the INode layer 200 of FIG. 1A may comprise or be embodied in one or more computer systems associated with a financial institution (e.g., a bank), and each UNode depicted in the UNode layer 500 of FIG. 1A may comprise or be embodied in one or more computer systems associated with a payer and/or payee on the blockchain transacting environment 100.

Entities associated with UNodes may hold accounts with, be members of, or otherwise be registered with the entities associated with one or more INodes. For example, UNodes may comprise one or more digital wallets owned by the network participant associated with the given UNode. The digital wallet may hold digital currency and/or enable access to digital currency through a credit or debit account. For purposes of the present disclosure, the term "digital currency" may refer to virtual currency, cryptocurrency, and/or central bank digital currency ("CBDC") which is electronic currency issued by a central bank and has the legal tender status declared by the a government. The digital wallet may include one or more of a digital currency based credit account (and BC checks associated therewith), a digital currency based debit account (and BC checks associated therewith), a fiat based credit account (and fiat based checks associated therewith), a fiat based debit account (and fiat based checks associated therewith), and/or a hybrid account where a hybrid account may operate as any combination of the foregoing (and hybrid based checks associated therewith, which may operate as a combination of both fiat based check and BC checks).

A digital wallet may be entity-specific or entity-agnostic. An entity-specific digital wallet is configured to hold BC checks that are issued by a specific entity only (e.g., Wells Fargo® digital currency checks and/or Wells Fargo® fiat checks, respectively). An entity-agnostic digital wallet is configured to hold BC checks that are issued by any number of entities, without regard to which entity issued the check.

For example, a digital currency based credit account in a UNode's entity-agnostic digital wallet may hold BC checks that are writeable, e.g., by a user associated with the UNode, whereby the user of the UNode may provide one or more inputs to generate and/or transmit a BC check that initiates a digital currency advance against the digital currency based credit line associated with the digital currency based credit account. The entity-agnostic digital wallet may include either or both entity-specific BC checks issued by different entities and/or entity agnostic BC checks. In both cases, however, because the digital currency underlying the BC check is CBDC, the BC check is pegged to a predetermined amount of fiat-currency (and/or the equivalent amount of digital currency).

Similarly, a digital currency based debit account in a UNode's entity-agnostic digital wallet may hold BC checks that are writeable, e.g., by a user associated with the UNode, whereby the user of the UNode may provide one or more inputs to generate and/or transmit a BC check that initiates a digital currency withdrawal against the digital currency based debit holdings associated with the digital currency based debit account. Alternatively, a user associated with the UNode may initiate a direct transfer of digital currency without the need to prepare a BC check. The entity-agnostic digital wallet may include either or both entity-specific BC checks issued by different entities and/or entity agnostic BC checks. An entity associated with a UNode may hold bank accounts with several different banks operating in the blockchain transacting environment 100 (corresponding to several different INode's operating in the blockchain transacting environment 100). In some embodiments, a digital wallet of a UNode may thus be configured to hold BC checks, some of which may be entity-specific to one bank (associated with one INode), others of which is entity-specific to another bank (associated with another INode), others of which may be consortium-specific to a group of banks (associated with a group of INodes), and others of which may be entity-agnostic, and others of which may be in the central bank currency-specific (i.e., having designations of currency issued by central banks—e.g., US Dollar USD, European Euro, etc.).

In some embodiments, either or both a digital wallet and/or the BC checks hosted therein may be configured to limit usage of BC checks to transactions meeting specific criteria (generally referred to herein as "criteria-specific BC checks"). For example, in some embodiments, either or both a digital wallet and/or the BC checks hosted therein may be geo-specific (i.e., geofenced BC checks only useable to make payments to participants in a specific geographical zone or for goods in a specific geographical zone) or geo-agnostic (i.e., non-geofenced BC checks useable to make payments to participants in any geographical zone or for goods in any geographical zone). In some embodiments, either or both a digital wallet and/or the BC checks hosted therein may be industry-specific (i.e., industry designated BC checks only useable to make payments to participants in a specific industry or for goods in a specific industry) or industry-agnostic (i.e., non-industry designated BC checks useable to make payments to participants in a specific industry or in any industry). In some embodiments, either or both a digital wallet and/or the BC checks hosted therein may be recipient-specific (i.e., recipient designated BC checks only useable to make payments to specific recipients (e.g., specific merchants)) or recipient-agnostic (i.e., recipient designated BC checks useable to make payments to any recipients (e.g., any merchant)). The foregoing criteria-specific BC checks may be transferrable to a third party as a form of payment in transactions that satisfy the criteria.

In some embodiments, a UNode may provide access to one digital wallet for each entity for which entity-specific BC checks have been issued to the user. In other embodiments, a UNode may provide access to one digital wallet that maintains multiple BC checks issued by multiple entities that have issued checks to the user. In other embodiments, a UNode may provide access to multiple digital wallets, each of which may maintain one or more BC checks held by the checkholder.

In some embodiments, a digital wallet and/or a BC check held therein may access, draw from, and/or impose limitations on digital currency upon a triggering event. The digital or fiat currency may be accessed via a deposit account (e.g., a debit/checking account) or a credit account (e.g., a credit line), or both (e.g., a debit/checking account with a reserve line) that are linked to the digital wallet. In some embodiments, digital wallet and/or a BC check held therein may access, draw from, and/or impose limitations on digital or fiat currency in debit account, credit account, or both when or responsive to the occurrence of a triggering event. A triggering event may be any event desired, as may be configured in connection with the digital wallet and/or BC check. For example, depending on the configuration, the occurrence of the triggering event may be, or be denoted by, a BC check being written by a user, generated by the digital wallet after being written, transmitted to the recipient after being written by a user and generated, validated (at any point desired), confirmed by the recipient after being received into the recipient's digital wallet, and/or cashed out by the recipient at a banking institution associated with an INode. In some embodiments, the occurrence of a triggering event may be contingent upon the balance of digital currency (and/or fiat currency) held within or accessible to checkholder's accounts (e.g., debit accounts, credit accounts, etc.).

In some embodiments, the digital wallet is directly linked to a fiat-based checking account, and upon a triggering event (e.g., the user writing the BC check) the corresponding amount of fiat currency (for which the BC check was written) is validated as being available within or accessible to the checking account, and is locked such that the same amount of fiat-currency cannot be double spent in a separate transaction. The fiat-currency remains locked until the time when it is withdrawn in connection with the recipient cashing out the check after receipt. In the case where the BC check is written for an amount of fiat currency, the amount of fiat-currency for which the BC check was written is locked such that the same amount of fiat-currency cannot be double spent in a separate transaction. In the case where the BC check is written for an amount of digital currency, the corresponding amount of fiat-currency that is equivalent to the amount of digital currency (based on a predetermined exchange rate) is locked such that the same amount of fiat-currency cannot be double spent in a separate transaction. The fiat-currency remains locked until (i) the time when it is withdrawn in connection with the recipient cashing out the BC check after receipt, (ii) the check expires (if an expiration date is set), (iii) the check is stopped (e.g., by a banking institution upon being notified the check has been lost or stolen), (iv) the check is canceled (e.g., by the user who wrote the check), or (v) otherwise terminated.

In some embodiments, if a user has a checking account (i.e., a deposit account) with a reserve line (i.e., a credit line that gets accessed when the account holder spends more funds than have been deposited into their deposit account), and also have a BC checking technologies in accordance with one or more embodiments of the present disclosure, a BC check available to a user may be configured such that it may be written to draw against the checking account and/or reserve line in a priority. For example, the BC check may be configured such that it may be written for an amount that will be locked and/or drawn against the deposited funds in priority relative to the reserve line funds—i.e., operating as a BC check drawing against the deposit funds in the checking account (e.g., with no interest applied) until the checkholder's checking account balance reaches zero, and then locked and/or drawn against the against the funds available through the reserve line (e.g., with an applicable interest rate) until the amount of funds validated to be drawn is sufficient to complete a transaction (e.g., a purchase). Accordingly, BC checks themselves may be considered a hybrid type of BC check as they can be configured to, alone or together with a digital wallet within which they are stored, access, draw from, or otherwise impose limitations (e.g., locking such funds to ensure the recipient can cash out the written amount) upon deposited funds and/or credit available within or accessible to the user's accounts. In some embodiments, the ability of a user to write a BC check of a given amount is contingent on a predefined parameter of any type (e.g., the ability of a user to write a BC check of a given amount may be made contingent upon the account holder's account balances, the ability of a user to write a BC check of a given amount may be made contingent upon the given amount being under a predetermined amount of funds that limits the amount for which a BC check may be written, etc.).

Moreover, while some examples identified above are provided with regard to a single checking account equipped with both a deposit and reserve feature, in some embodiments the same may not be available. For instance, the user may instead have a deposit account that is distinct from his/her credit account. Nevertheless, the BC checks of the present disclosure may be configured such that they may be written to lock funds within, initiate a validation request in connection with, and/or draw against the checking account (in accordance with a priority or rule, with no interest applied) until the checkholder's checking account balance reaches zero; and then lock funds within, initiate a validation request in connection with, and/or draw against a separate credit line to complete a transaction (e.g., a purchase).

In still further embodiments, the BC checks of the present disclosure may be configured to lock funds within, initiate a validation request in connection with, and/or draw against any number of debit accounts and/or credit accounts—in a priority in accordance with predefined rules—to complete a transaction (e.g., to pay a payee, to complete a purchase, etc.). For example, if a user has one fiat-based checking account ("Debit Account 1"), one digital currency base-checking account ("Debit Account 2"), one fiat-based credit line ("Credit Account 1"), and two digital currency based credit lines ("Credit Account 2" and "Credit Account 3"), where all of the accounts are linked to the user's digital wallet and accessible via one or more BC checks (e.g., the accounts are held by banks that are members of a bank consortium within the blockchain supported transaction network, the user may generate, transmit, or otherwise provide a BC check that can access funds (e.g., fiat funds and/or digital currency based funds) from any one or more of those accounts based on predefined rules that the user sets (or which are set by default). For example, suppose the user (i.e., the network participant) that owns the aforementioned accounts would like to make a $1000 USD payment to another user (e.g., another network participant) using a BC check held in the digital wallet of his UNode. Suppose further that the aforementioned five accounts associated with his digital wallet include the following balances, respectively: $200 USD in Debit Account 1, 300 units of digital currency (exchangeable for equivalent to $300 USD) in Debit Account 2, $421 USD of available fiat-based credit in Credit Account 1 at 5% interest, 224 digital currency of available credit (exchangeable for equivalent to $224 USD) in Credit Account 2 at 3% interest, and 15,000 digital currency of available credit (exchangeable for equivalent to $15,000 USD) in Credit Account 3 at 12% interest. Suppose further that the user has preselected, through their digital wallet, to make the payment using any of the aforementioned accounts in a priority that achieves the lowest interest on a transaction-by-transaction basis. Utilizing a BC check of the present disclosure, the user may utilize their INode to write and generate a BC check for transmission to a payee in the amount of 1000 digital currency (which the payee can then cash out for the full amount, which is equivalent to $1000 USD). Upon a triggering event (e.g., the writing and/or generation of the BC check), the appropriate amount of funds may be locked in connection with the user's accounts. The bank(s) and/or INode(s) controlling respective accounts may impose the lock (either through a digital wallet or otherwise) on the appropriate amount of funds in each respective account, in amounts dictated in whole or in part by a priority (based on a predefined priority rule). The predefined priority rule may be set and/or imposed by the blockchain itself, the bank(s) hosting the blockchain, the account configurations associated with the bank accounts, the INode(s) associated with the bank(s) hosting the blockchain, and/or the UNode associated with the user (e.g., via the digital wallet hosted by the digital wallet). As such, upon the triggering event and in accordance with the user's priority preference, a hold or lock may be placed upon the digital currency and/or fiat funds that will be used to satisfy the amount the check was written for. In the foregoing example, a lock would be placed on all $200 USD in debit account 1, all 300 digital currency in debit account 2, then all 224 digital currency of available digital currency credit in credit account 2 (at 3% interest), and then $276 USD of the $421 USD of available fiat currency credit in credit account 1 (at 5% interest), and no digital currency from the 15,000 digital currency of available digital currency credit in credit account 3 at 12% interest. As may be seen from the foregoing example, in some embodiments the BC checks of the present disclosure can be configured to operate to access, draw from, or otherwise impose limitations (e.g., locking such funds to ensure the recipient of the BC check can cash out the BC check for the written amount) on one or more credit and/or debit accounts, based on a predefined priority, rule, or parameter of any type (e.g., the account holder's account balances).

Additionally, the UNode and/or INode(s) (e.g., via a digital wallet hosted by either or both, the blockchain hosted in whole or in part by the INode, and/or by any other component or utility of the blockchain supported transaction network) and/or the account(s) (e.g., bank accounts) associated with a network participant can be configured to provide management functionality, alone or in coordination with other resources within blockchain transacting environment 100, such as accessing, transferring, converting, sending, receiving, releasing, exchanging, depositing, withdrawing, requesting, moving, securing or otherwise operating on digital currency and/or fiat funds (e.g., US dollars), and/or BC checks upon request. A UNode and/or INode(s) (e.g., via a digital wallet hosted by either or both, the blockchain hosted in whole or in part by the INode, and/or by any other component or utility of the blockchain supported transaction network) and/or the account(s) (e.g., bank accounts) associated with a network participant may further be configured to execute code to provide balance reporting after one or more transactions has occurred involving fiat currency or digital currency (whether by BC check or otherwise) managed thereby, which may be accessible or viewable via a user device or other device within the blockchain transacting environment 100. In some embodiments, a UNode's balance may be reported by the UNode itself, by the blockchain, by the one or more INodes hosting the blockchain, and/or by the accounts associated with the network participant (and linked to the UNode).

In some embodiments a UNode and/or INode(s) (e.g., via a digital wallet hosted by either or both, the blockchain hosted in whole or in part by the INode, and/or by any other component or utility of the blockchain supported transaction network) and/or the account(s) (e.g., bank accounts) associated with a network participant may be configured to store, transmit, receive, exchange, and/or scan one or more of a user identification object (e.g., a photo, a name, an avatar, a thumbnail, or other user ID object associated with the owner of the UNode, the associated digital wallet, and/or the associated bank accounts); a wallet address (sometimes referred to herein as a Wallet ID); digital currency; a BC checks; a transaction history; a digital currency based payment cards, a fiat based payment cards; a hybrid digital currency-fiat based payment cards (e.g., capable of carrying digital currency and/or access to a fiat credit line); a biometric information (e.g., fingerprint information, retinal information, facial feature information, voice information, other biometric features), or other information associated with the payer or payee network participant (i.e., the owner of the UNode(s), the associated digital wallet(s), and/or the associated bank account(s)).

In some embodiments, a UNode (e.g., via a digital wallet application running thereon, or other component or utility) may utilize biometric information to further require authentication credentials (e.g., a facial feature, a voice feature, a fingerprint feature, etc.) before a user is able to access certain features or perform certain functions (e.g., to generate a BC check, to validate a BC check, to cash out a BC check, to initiate a transfer of digital currency, to exchange digital currency for fiat currency, and/or any other functionality described herein, etc.). UNode (e.g., via a digital wallet application running thereon, or other component or utility) may utilize biometric information alone or together with other authentication credentials (e.g., PIN numbers, passcodes entered via an input interface) to provide enhanced security (e.g., providing enhanced security at the application level) prior to making further functionality available to the user (e.g., through a digital wallet app). In some embodiments, UNode (e.g., via a digital wallet application running thereon, or other component or utility) may prompt the user to provide authentication credentials at various stages or events—e.g., after a certain period of time has elapsed with no input from the user, periodically after a certain period of time has elapsed without one or more activities (e.g., user inputs), with each attempted BC check generation request and/or deposit receipt (or any other attempted BC check movements, or digital currency movements generally).

In some embodiments, UNode and/or INode(s) (e.g., via a digital wallet hosted by either or both, the blockchain hosted in whole or in part by the INode, and/or by any other component or utility of the blockchain supported transaction network) and/or the account(s) (e.g., bank accounts) associated with a network participant may further be configured to initiate and/or facilitate a back-up operation (e.g., periodic back-up, on demand back-up, or one-time back-up) for later restoration by a given network participant as needed (e.g., if the given network loses their digital wallet (e.g., loses their UNode device such as their smart phone)). Moreover, the host of a UNode's digital wallet (whether the UNode itself or an INode associated with the UNode) may be able to cancel, replace, and/or restore a digital wallet (including available BC checks held therein, the digital currency holdings therein, or otherwise) in the event that a digital wallet of a network participant (e.g., a payer or a payee) is lost, stolen, damaged, corrupted, or otherwise becomes unusable.

In some embodiments, a digital wallet and/or a BC check may be linked to multiple accounts and/or multiple network participants (i.e., shared accounts between network participants with commonly shared finances e.g., spouses). In some embodiments, a check issuing bank's INode may host the one or more digital wallets and may link multiple BC checks to each digital wallet. In some embodiments, an instance of the shared digital wallet(s) and/or BC checks may be viewable from the checkholders' respective UNode(s) while being hosted by the associated INode(s)—i.e., the BC checks are not actually carried by such UNodes.

Alternatively, in some embodiments where shared digital wallet(s) and/or shared BC checks are desired, the multiple entities desiring the shared arrangement may designate a primary holder of the digital wallets and/or the BC checks, and a secondary holder of the digital wallets and/or the BC checks. The primary holder's UNode may host the actual digital wallet and/or the BC checks, while the secondary holder's UNode may only access an instance of the actual digital wallet and/or BC checks and may generate BC checks to transmit to payees indirectly (e.g., by communicating with the primary holder's UNode to cause the primary holder's UNode (e.g. via its digital wallet application or other component) to generate and/or transmit the BC checks to another network participant (for example, to the digital wallet of a UNode held by a payee network participant with whom the secondary holder desires to transact).

Entities associated with INodes may maintain accounts for, biometrics information for, memberships of, registration information for, and/or other information for the entities associated with one or more UNodes. In addition to the aforementioned features, an INode may be configured to issue BC checks, extend a digital currency based credit account, a digital currency based debit account, a fiat based credit account, a fiat based debit account, and/or a hybrid account where a hybrid account may operate as any combination of the foregoing. An INode may maintain a blockchain in connection with any transaction involving the INode and/or any UNode that has a form of membership with the INode (e.g., an account holding membership, a non-account holding membership, or other form of registration). Additionally or alternatively, a group of INodes (i.e., an INode Consortium) may maintain a blockchain in connection with any transaction involving any one or more of the INodes within the group and/or any UNode that has a form of membership with one or more of the INode(s) (e.g., an account holding membership, a non-account holding membership, or other form of registration).

With respect to a digital currency based credit account, an INode may extend a digital currency based credit line to the entity associated with the UNode holding the digital currency based credit account. In connection with the digital currency based credit account, the entity associated with the INode may also issue a BC check to the entity associated with the digital currency based credit account. The BC check may comprise a writeable check providing the entity associated with the UNode access to the digital currency based credit line. The BC check may be linked to a digital wallet of the UNode associated with the checkholder. The digital wallet (and the checks held and/or digital currency deposited therein) may be hosted by either or both the UNode associated with the checkholder and/or the INode associated with the bank that issued the BC check to the network participant associated with the UNode.

An INode may give a UNode's (e.g., via its digital wallet app) access to BC checks. BC checks may be entity-specific (i.e., BC checks specifically associated with the financial institution who issued the BC checks), entity-agnostic (i.e., BC checks not specifically associated with the financial institution who issued the BC checks, but which may be backed by at least one financial institution), multi-entity (i.e., BC checks specifically associated with multiple financial institutions, including the financial institution who issued the BC checks), or any combination of the foregoing. For example, if Wells Fargo® was a bank associated with a first INode, and JP Morgan Chase® was associated with a second INode, the first INode could issue Wells Fargo BC checks and the second INode could issue JP Morgan Chase® BC checks.

An INode may provide BC checks to a UNode contingent on a number of predefined factors. For example, an INode may make a number BC checks available to a UNode (e.g., via a digital wallet app) based on a credit limit for which the UNode applied for and qualified (e.g., based on creditworthiness or some other factor). The credit limit may correspond to an amount of fiat currency or digital currency to which the user has access through a credit account. An INode may issue a number of BC checks to a UNode so that the network participant associated with the UNode may transact with network participant(s) associated with other UNode(s) within the blockchain transacting environment 100 (providing the entity associated with the UNode the ability to initiate a payment to the other UNode(s) with BC checks instead of fiat currency).

The BC checks can be in the form of a digital BC check (which may comprise machine readable code that can be linked to one or more accounts, and which may further comprise an electronic form that is either or both viewable and/or editable) or a paper BC check.

In the context of a digital BC check, an issued BC check may be a blank/writeable BC check or a pre-written BC check that has been provided to a UNode by an INode for use in transacting with other network participants on a blockchain supported transaction network. In some embodiments, a blank BC check may comprise the machine readable code before modification when the check is written (e.g., which may occur responsive to a user editing the corresponding form). In the context of a digital BC check, a written BC check may comprise the machine readable code after modification upon the check being written (e.g., which may occur responsive to a user editing the corresponding form). In the context of a digital BC check, a pre-written BC check may comprise the machine readable code for a BC check having an amount pre-defined by the issuer of the check (e.g., pre-defined by the financial institution associated with an INode). In the context of a digital BC check, a generated BC check may comprise a written BC check or a pre-written BC check with machine readable code that has been modified to include all of the information needed to convey payment to another network participant by transferring the generated BC check to such other network participant. In the context of a digital BC check, a transferred BC check may comprise a generated BC check that has been sent or transmitted, directly or indirectly, from one node (e.g., a UNode or an INode) to another node (e.g., a UNode or an INode) of a blockchain supported transaction network. In the context of a digital BC check, a validated BC check comprises a written BC check or a pre-written BC check that has been validated by a relevant blockchain, the validation comprising a determination about whether the BC check is approved for use in the proposed transaction in the designated amount. Such validation may include determining if the user accounts against which the BC check will be drawn contain sufficient funds to support the amount of the check. In the context of a digital BC check, a confirmed or endorsed BC check comprises a transferred BC check for which the recipient has provided an acknowledgement of receipt and/ or acceptance in some form (e.g., a digital signature, a free-form signature, a selection, an approval, a confirmation of receipt and acceptance, or otherwise). BC checks of any type may be stored in a UNode and/or an INode, and/or within a digital wallet hosted by either of the foregoing.

In the context of a paper BC check, an issued BC check may be a paper format blank/writeable BC check or a paper format pre-written BC check that has been provided to a UNode by an INode for use in transacting with other network participants on a blockchain supported transaction network. Paper BC checks are different than traditional paper checks in several ways. Each individual paper BC check has a scannable or otherwise readable QR code (or other scannable/readable code) printed directly onto or within the fabric of the paper BC check, for example, by the financial institution who issued the paper BC check. The scannable QR code is a unique identifier for the specific paper BC check upon which it is printed. The scannable QR code can be associated with the checkholder network participant, a particular account, an amount designated for a particular transaction, a biometric signature, or other information relevant to a particular transaction. A checkholder may use the printed BC in a transaction by (i) inputting the transaction details (e.g., the amount, the recipient, the date) either (a) directly onto the paper check, or (b) into an electronic form presented on an interface accessible via the checkholder's UNode, (ii) scanning the QR code (or other scannable/readable code) printed on the paper BC check, which causes the transaction details to be associated with the printed BC check in real-time or near-real time at the point of sale (or point of transaction, as the case may be), and then giving the check to the payee network recipient. The association of the transaction details with the printed BC check may occur responsive to a validation operation wherein the blockchain determines if the amount and/or the recipient and/or the other transaction details satisfy validation criteria (e.g., determining if there are sufficient unlocked funds in the accounts against which the check will be drawn, and which funds may be locked to ensure cashability (the ability of a BC check to be cashed out) of the instant paper BC check). If validated, the blockchain may provide a validation indication to either or both the payer network participant and the payee network participant. In some embodiments, the validation indication signifies that an amount of funds in the payer network participant's accounts has been locked (such that the same funds cannot be used for another transaction before the payee cashes the paper BC check). In the case where the blockchain provides the validation indication to the payee network participant, the payee network participant may receive (and/or endorse) the paper BC check with confidence that it may cash out the paper BC check for the full amount designated on the paper BC check. In the case where the blockchain does not provide the validation indication to the payee network participant responsive to the aforementioned validation operation, the payee network participant may itself scan the paper BC check (e.g., with a Point of Sale ("POS") device, or with its UNode, etc.), and initiate a validation operation with the blockchain. Once validated, the payee network participant may accept (and/or endorse) the paper BC check with confidence that it may cash out the BC check for the full amount designated on the paper BC check. Once validated by the blockchain and accepted/endorsed by the payee network participant, the payee network participant may physically take the paper BC check to the financial institution associated with a check issuing INode with whom the payee network participant is a member (e.g., either an account holding member or a non-account holding member, for instance) and cash it out. Alternatively, the payee network participant may cash the check by scanning the QR code with its own device (e.g., with a Point of Sale ("POS") device, or with its UNode, etc.) and, through one or more selections via its UNode, request that the paper BC check be cashed and the funds deposited in one of the payee network participant's accounts.

Referring still to the context of paper BC checks, a blank BC check may comprise a physical paper form check with blank fields to be filled out by the checkholder, together with a QR code (or other scannable/readable code) printed directly on or embedded within the fabric of the paper BC check. In the context of a paper BC check, a written BC check may comprise the blank BC check as modified by the checkholder inputting transaction details within one or more of the blank fields. In the context of a paper BC check, a pre-written BC check may comprise a physical paper form check with the transaction details pre-filled by the issuer of the paper BC check (e.g., having an amount pre-defined by the financial institution that issued the BC check, having a recipient pre-defined by the financial institution that issued the BC check, etc.). In the context of a paper BC check, a generated BC check may comprise a written BC check or a pre-written BC check in paper format whose QR code has been scanned and associated with one or more of the transaction details. In the context of a paper BC check, a transferred BC check may comprise a generated BC check that has been sent or transmitted, directly or indirectly, from a payer network participant to a payee network participant. In the context of a paper BC check, a validated BC check comprises a written BC check or a pre-written BC check that has been validated by a relevant blockchain, the validation comprising a determination about whether the paper BC check is approved for use in the proposed transaction in the designated amount. Such validation may include determining if the user accounts against which the BC check will be drawn contain sufficient funds to support the amount of the check. A confirmed or endorsed BC check comprises a transferred BC check for which the recipient has provided an acknowledgement of receipt and/or acceptance in some form (e.g., a wet signature, a digital signature, a free-form signature, a selection, an approval, a confirmation of receipt and acceptance, or otherwise). BC checks of any type may be stored in a UNode and/or an INode, and/or within a digital wallet hosted by either of the foregoing.

Although several examples herein make reference to a BC check generally, it should be understood that none of these references are intended to be limited to a BC check of a particular type (e.g., a paper BC check, a digital BC check, a criteria-specific BC check in paper format, a criteria-specific BC check in digital format, etc.). Instead, all such references to BC checks should be understood as referring to any type of BC check (e.g., a paper BC check, a digital BC check, a criteria-specific BC check in paper format, a criteria-specific BC check in digital format, etc.) as may be used in a given scenario.

In connection with issued BC checks, the financial institution associated with the INode may elect to only charge interest to payer network participant associated with the UNode to the extent that a transferred BC check locks and/or is drawn against the fiat currency or digital currency accessible through one or more credit accounts. Further, in such cases where a transferred BC check does initiate a lock and/or is drawn against the fiat currency or digital currency accessible through one or more credit accounts, the financial institution may commence interest charges after the payee network recipient cashes out the BC check, and continue to charge interest until the time that the original payer completes repayment for the fiat currency and/or digital currency drawn from the credit account. In some instances, the financial institution associated with the INode may elect to only charge interest to the payer network participant for BC checks that have been cashed out (against a credit account of the payer) and not paid back (in either fiat currency or in digital currency) within a particular grace period (e.g., one month grace period).

Equipped with a BC check from an INode, an entity associated with the UNode the ability to initiate a payment to the other UNode with a BC check instead of traditional paper checks. This may be preferable for a number of reasons. First, utilizing a BC check may enable the UNode (or the network participant associated therewith) to transact with another UNode (or the network participant associated therewith) in a manner preferred by one or both such UNodes. For instance, among other reasons, the network participant(s) associated with one or more of the UNodes may prefer to pay and/or be paid in BC checks (exchangeable for digital currency or fiat currency) rather than traditional paper checks because the fees incurred when sending and/or receiving payments in the form of BC checks (exchangeable for digital currency or fiat currency) may be less than the fees incurred when sending and/or receiving payments in the form of traditional paper checks. In another example, among other reasons, the network participant(s) associated with one or more of the UNodes may prefer to pay and/or be paid in BC checks (exchangeable for digital currency or fiat currency) rather than traditional paper checks because validation (e.g., authentication and/or authorization) within the blockchain transacting environment is quicker and/or more secure than in the traditional checking environment. In another example, among other reasons, the network participant(s) associated with one or more of the UNodes may prefer to pay and/or be paid in BC checks (exchangeable for digital currency or fiat currency) rather than traditional paper checks because clearing and settlement within the blockchain transacting environment occurs more quickly and/or efficiently than in the traditional checking environment. In other examples, among other reasons, the network participant(s) associated with one or more of the UNodes may prefer to pay and/or be paid in BC checks (exchangeable for digital currency or fiat currency) rather than traditional paper checks because the use of BC check may reduce or avoid bounced checks (and related fees and time delays associated with bounced checks), may streamline and simplify the processes encountered when dealing with lost checks, may enable the recipient to—as an alternative to cashing out the BC check—use the BC check as a form of payment to a secondary recipient (who may also use the BC check as a form of payment to a tertiary recipient, and so on to any Nth level recipient), may streamline and simplify the processes encountered when attempting to stop/cancel a check that has been previously written, may provide more security including but not limited to biometric authorizations and/or signatures. Moreover, at least in the context of digital BC checks, a payer may have access to an unlimited number of BC checks right from their UNode device instead of having to order checks from a bank and await their arrival in the mail as is often the case with traditional checks. Those of skill in the art will recognize that there are many additional reasons why a particular UNode may prefer to pay or be paid in BC checks (exchangeable for digital currency or fiat currency) than in fiat based checks or fiat based cards.

In some embodiments, all or a portion of a previously written BC check of the present disclosure may be re-writeable and/or transferrable to designate a second, third, . . . Nth recipient. That is, in some embodiments, a recipient of a BC check can add and/or change the payee of the check into the name of another recipient (e.g., to whom the first recipient wishes to send the amount of the BC check as part of another transaction). In such embodiments, the blockchain may maintain a log of all additional and/or changed recipients a particular BC check, including between the time that the BC check is first written and the time that the BC check is cashed out. Moreover, each time the BC check is re-written to designate a new or changed recipient, the blockchain may confirm that the fiat currency and/or digital currency that was locked in the original payee network participant's account still continues to be locked to ensure future cashability.

Consequently, within the blockchain transacting environment, a BC checkholder associated with a UNode may pay a payee associated with another UNode in BC checks. The payee UNode (e.g., the merchant) can send the BC check it received from the payer UNode (e.g., the BC checkholder) directly to the INode associated with the financial institution that issued the BC check to the payer UNode (i.e., the issuing bank). The INode can then send fiat currency (or digital currency, as may be desired/selected by the payee via its Unode) directly to the INode associated with the payee UNode's bank account (which in some embodiments may be associated with the same financial institution as the payer UNode, or which may be associated with a different financial institution altogether) who may then either deposit fiat funds (or digital currency, as may be desired) corresponding to the amount of digital currency received into the payee UNode's bank account or, as may be desired in some cases, deposit an amount of digital currency into the digital wallet of the payee UNode (such digital currency may be the same digital currency received. This scenario provides enhanced benefits for use of BC checks domestically (i.e., within the same country in which the BC check was issued).

Alternatively, the payee UNode can also send received BC checks to the INode associated with its own bank account, and such INode can then send different BC check to the INode associated with the financial institution who issued the BC check, and collect digital currency and/or fiat currency from such INodes in exchange for such BC check, and then distribute the digital currency or fiat currency into to payee UNode's account. This scenario provides enhanced benefits for use of BC checks in foreign countries (i.e., for transactions in a different country than the country within which the BC check was issued).

Moreover, in all such scenarios, if the device embodying the UNode device is lost or stolen, the technology of the present disclosure allows for prompt restoration of any uncashed BC checks (and/or related digital wallets) upon replacement of the device embodying the UNode. This is made possible because (1) the UNode's bank (i.e., the financial institution associated with the INode where the UNode holds an account) carries BC check information (e.g., account/iban number, Swift code/routing number, check number, check status, written amount, and the like) and the transaction history is apparent from the blockchain hosted in whole or in part by the INode, and (2) the UNode's bank (i.e., the financial institution associated with the INode where the UNode holds an account) is configured with the ability to issue and/or re-issue BC checks. Thus, upon verifying the lost/stolen nature of a particular BC check (and/or digital wallet hosting such BC check), the issuing bank (via its INode) may terminate/cancel certain lost BC checks and replace such certain lost BC checks with new BC checks.

Moreover, in some embodiments, the BC Checks issued by INode(s) for transacting within the blockchain transacting environment, may be configured to have no expiration date (i.e., being perpetually active), or may be configured to expire upon a preselected date and/or timeframe after being issued, written, generated, transferred, confirmed, or other event.

These features, among others, provide a more efficient mechanism for check payments that incur fewer processing fees, require fewer parties than traditional check payments in traditional transaction networks (e.g. with the present technology, the need to go through payee's bank to cash out a BC check is unnecessary), permit pre-transaction validation (e.g., validation occurring before the BC check is transmitted to the payee, and in some instances before the BC check is even written and/or generated) thereby avoiding bounced checks. The BC checking solutions of the present disclosure are particularly useful in the context of domestic check based transactions, as well as in foreign check based transactions.

In addition to the aforementioned features of the nodes and blockchains of the illustrated examples, the blockchain validating the transactions contemplated herein may optionally be distributed among the INodes and/or UNodes as described in U.S. application Ser. No. 16/820,661, which is incorporated herein by reference in its entirety.

FIG. 1B is a diagram illustrating another example blockchain transacting environment 102 in which one or more embodiments of the present disclosure may be implemented. The example blockchain transacting environment 102 of FIG. 1B is similar to the example blockchain transacting environment 100 of FIG. 1A (with like numerals denoting like elements), except that in the blockchain transacting environment 102 of FIG. 1B, INode_A 210 and INode_B 220 do not host separate blockchains (e.g., Blockchain A and Blockchain B of FIG. 1A), but instead host one or more portions of the same blockchain—blockchain AB. In the example blockchain transacting environment 102 of FIG. 1B, INode_A 210 and INode_B 220 have formed an INode Consortium 201 such that—for purposes of validation, processing, recording, and/or cashing—the consortium of INodes may operate in concert with one another, building upon and utilizing the same blockchain (and sharing the benefit of each other's resources, such as external resources 214, 224, with one another) to increase efficiency.

Referring to FIG. 1B, INode Consortium AB 201 may be made up of any two or more INodes participating within the blockchain transacting environment. The two or more INodes may together host a shared blockchain. In addition to hosting a shared blockchain such as blockchain AB 213 in FIG. 1B, individual INodes of a consortium may also, optionally, host their own individual blockchains. Further still, an INode may be part of multiple consortiums within the same blockchain transacting environment 102.

Although not depicted in FIGS. 1A-1B, INode Layer 200 may include any "N" number of INodes (an example of which is depicted in FIG. 1C). FIG. 1C is a diagram illustrating the example blockchain transacting environment 102, but in this depiction including two consortiums formed between two subsets of three INodes. As shown, INode A 210 and INode B 220 belong to INode Consortium AB 201. Similarly, INode B 220 and INode N 230 belong to INode Consortium BN 203. As shown, INode B belongs to two distinct INode consortiums—INode Consortium AB 201 and INode Consortium BN 203. It should be appreciated based on FIGS. 1A-1C and the description herein, that any given INode operating within blockchain transacting environment 100 and/or 102 may belong to one consortium, multiple consortiums, or no consortium at all.

Figure 2:
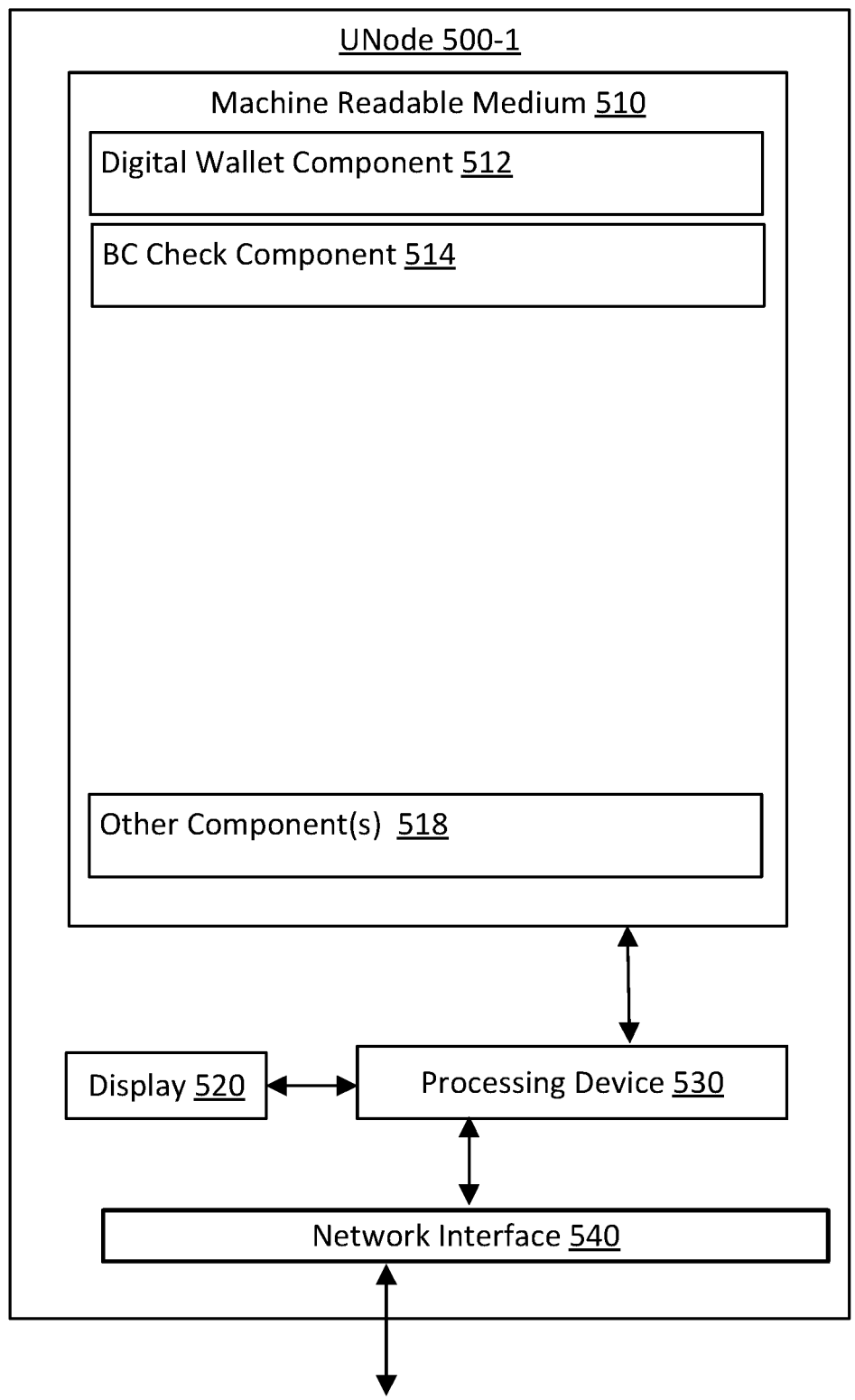
FIG. 2 is a diagram illustrating an example architecture of components of a UNode in accordance with one or more embodiments of the present disclosure.
Figure 3:
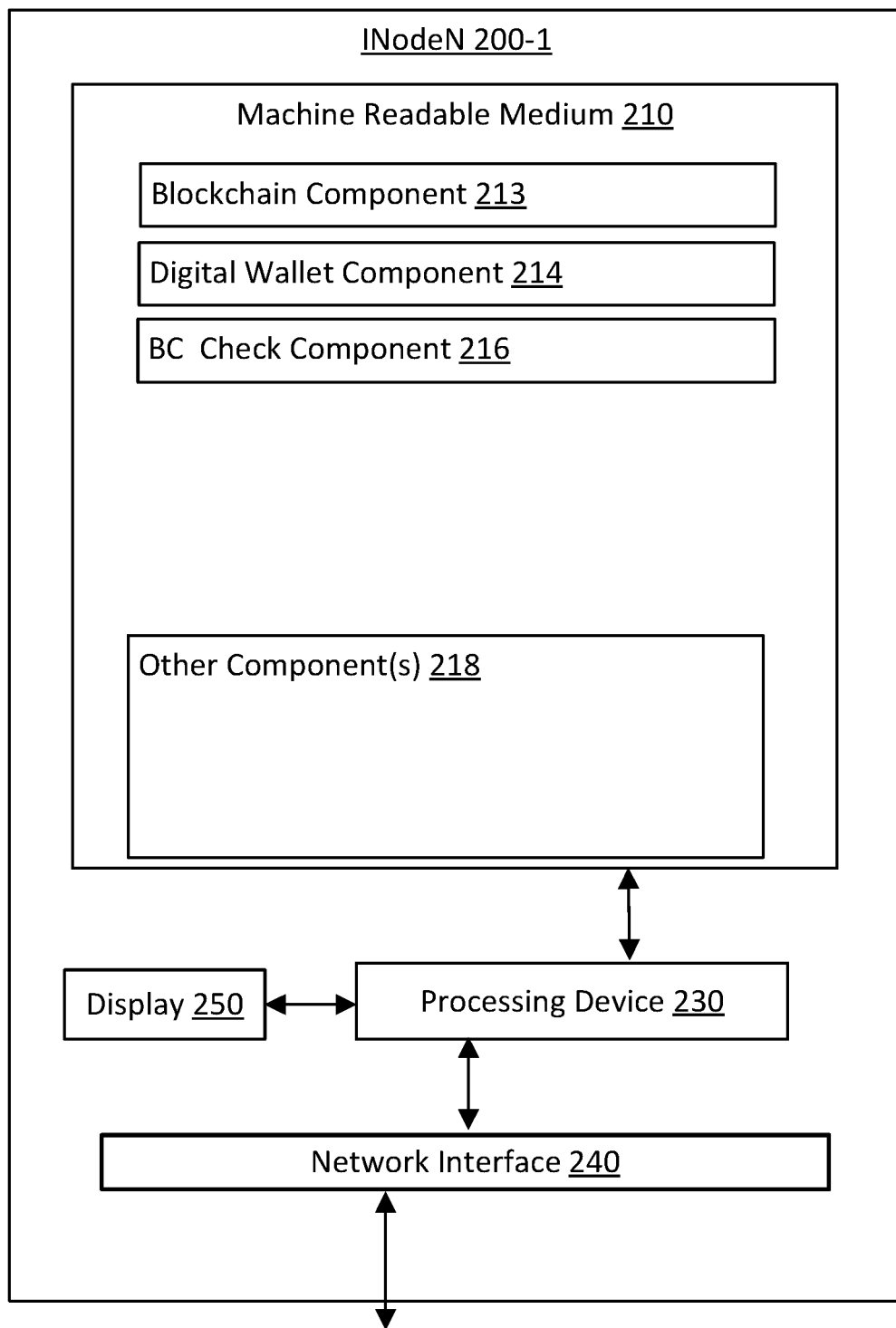
FIG. 3 is a diagram illustrating an example architecture of components of an INode in accordance with one or more embodiments of the present disclosure.

FIG. 2 is a diagram illustrating an example architecture of components of an example UNode 500-1, in accordance with one or more embodiments of the present disclosure. FIG. 3 is a diagram illustrating an example architecture of components of an example INode 200-1, in accordance with one or more embodiments of the present disclosure. Each component of the example UNode and example INode will be introduced here with reference to FIGS. 2-3, followed by additional features and context provided in examples discussed with reference to FIGS. 4-6.

Referring now to FIG. 2, UNode 500-1 may include a machine readable medium 510 having instructions stored thereon, which, when executed by one or more processors, cause one or more of the disclosed features to be effectuated. The machine readable medium may have machine readable code comprising a Digital Wallet Component 512, a BC Check Component 514, and one or more other components 518 configured to offer a number of additional features, enhancements, and functionality.

Digital wallet component 512 may be configured to maintain and secure, alone or in coordination with other resources within blockchain transaction environment 100, a digital wallet owned by the network participant and associated with the given UNode. The digital wallet may include a network participant's digital currency holdings (which may, in some instances, have been sourced from digital currency based loans) and one or more writeable BC checks. Digital wallet component 512 can be configured to provide management functionality, alone or in coordination with other resources within blockchain networking environment 100, such as (i) editing, generating, transmitting, and otherwise managing BC checks; (ii) transferring, converting, sending, receiving, releasing, exchanging, depositing, withdrawing, moving, securing or otherwise operating on digital currency and/or fiat funds upon request. For example, digital wallet component 512 may be configured to (alone or together with one or more components of UNode 510 and/or one or more components of an associated INode) generate a BC check in an amount designated by an authenticated user (e.g., the checkholder), place a hold on the amount of digital or fiat currency designated in the BC check (sometimes referred to herein as placing a "lock" on such funds) transfer the BC check from the digital wallet of UNode 510 into a digital wallet of another UNode as part of a transaction, and/or receive a BC check into the digital wallet of UNode 510 from another UNode's digital wallet as part of a transaction, and/or redeem BC checks for cash with appropriate INodes, and/or receive digital currency from appropriate INodes in exchange for BC checks and/or as part of a digital currency based credit line (which may, in some embodiments, may be connected to a digital currency based loan, as described in U.S. application Ser. No. 16/820,661, which is incorporated by reference herein in its entirety). In some embodiments, one or more components of an associated INode causes a hold on funds in the checkholder's accounts (which may be based on a priority rule or preference) that are anticipated to be used to satisfy the amount designated on the BC check when the recipient proceeds to cash the BC check.

A digital wallet hosted by digital wallet component 512 of a UNode 510 may be configured to effectuate a release or transfer of a BC check into another digital wallet, effectuate an exchange of digital currency for cash, effectuate an exchange of cash for digital currency, effectuate an exchange of BC checks for digital currency, effectuate an exchange of cash for BC checks, effectuate a deposit of digital currency in connection with a BC check, effectuate a withdrawal of digital currency in connection with a BC check, and so on in connection with one or more digital wallets and/or the accounts linked thereto (e.g., deposit accounts, credit accounts, check accounts, etc.).

In some embodiments, a digital wallet may comprise a mobile (e.g., iOS or Android based) or desktop (e.g., PC or Mac based) app that stores one or more BC checks. BC checks may (i) be linked to accounts held at different issuing banks (ii) comprise or have access to digital currency with a currency designation (US, European, Chinese, Canadian, etc.). A digital wallet may store the various BC checks it receives from other digital wallets (e.g., facilitated by respective digital wallet components) or elsewhere, and may be utilized to pay or otherwise transfer BC checks to other network participants (including other banks such as issuing banks). In some embodiments the network participant(s) associated with one or more of the UNodes may, as an alternative to cashing out a BC check received from another network participant—use the received BC check as a form of payment to a secondary recipient (who may also use the BC check as a form of payment to a tertiary recipient, and so on to any Nth level recipient). In some embodiments, to use a received BC check as a form of payment to another recipient, a signature of the original payer network participant must be connected with the BC check; in some embodiments, to use a BC check as a form of payment to another recipient, a signature of the original payer network participant and all recipient payee network participants must be connected with the BC check. In some embodiments the digital wallet component 512 facilitate the collection of signatures, and/or the change or addition of a new or additional recipient in connection with a previously written BC check.

In some embodiments, when a BC check is generated, the INode and/or the UNode informs the associated blockchain about the BC check amount, the identity of the payer (e.g., name, wallet ID, bank account #, bank routing number, physical address, check ID, date, etc.), the identity of the payee info (e.g., name, wallet ID, bank account #, bank routing number, physical address, check ID, date, etc.). In some embodiments, when payer pays a payee, the blockchain validates the transaction information together with payer's authorization (e.g., a digital or biometrics signature); and, after the BC check has been transferred to the payee, the blockchain is updated to reflect that the payee is now the checkholder (and to reflect that the original payer is no longer the checkholder). In some embodiments, where the original payee utilizes the BC check to either pay another third party and/or to cash out the check from the issuing bank, the blockchain will also be updated to reflect the changed "checkholder" and/or the changed check status (e.g., as cashed out, stopped, canceled, floating, alive/active, re-written, etc.).

A digital wallet component 512 may be configured to operate a digital wallet application configured to store, pay and/or receive different digital currencies issued by various central banks, and further to store a user identification object (e.g., a photo, a name, an avatar, a thumbnail, or other user ID object associated with the owner of the digital wallet), a wallet address (sometimes referred to herein as a Wallet ID). The digital wallet application may, as described further herein, intelligently select the best payment method (e.g., select among a plurality of optional BC checks and/or accounts associated with such BC checks) for a given transaction. A digital wallet can further be configured to receive receipts, enter data, provide endorsements (e.g., signatures), scan or sync codes (e.g., routing numbers, account numbers, etc.), and/or receive feedbacks as to whether or not the generation, receipt, and/or transmission of a BC check for a proposed transaction was successful or failed.

Digital wallet component 512 may (alone or together any other INode component and/or UNode component) be configured to authenticate a user using stored or otherwise accessible authentication information (e.g., biometric information, PIN numbers, Wallet ID). Digital wallet component 512 may (alone or together any other INode component and/or UNode component) be configured to confirm a transaction using stored or otherwise accessible authentication information (e.g., biometric information, PIN numbers, Wallet ID). Digital wallet component 512 may (alone or together any other INode component and/or UNode component) be configured to scan, read, receive, collect, store, compare, and/or distribute biometric information (e.g., fingerprint information, retinal information, facial feature information, voice information, other biometric features) for one or more users to enable verification comparisons to enable such authentication. In such embodiments, authentication information may enhance privacy and detect/prevent attempted fraudulent activity. It should be noted that biometrics information for network participants may be stored (i) directly within the blockchain such that authentication initiated by digital wallet component 512 (or another INode component and/or UNode component) may be performed by and/or based on the information stored in the blockchain, and/or (ii) locally within an INode such that authentication initiated by digital wallet component 512 (or another INode component and/or UNode component) may be performed by and/or based on the information stored in the INode (iii) locally within a UNode such that authentication initiated by digital wallet component 512 (or another INode component and/or UNode component) may be performed by and/or based on the information stored in the UNode.

Digital wallet component 512 may be configured to include or be operatively coupled with Bluetooth® or other IOT communication capabilities to enable syncing with or otherwise reading information from other digital wallets held in other UNodes and/or INodes of a blockchain transacting network.

Digital wallet component 512 may be configured to execute code to lock digital currency, or allow an associated INode to lock digital and fiat currency, in an amount sufficient to support a BC check to be generated to complete a proposed transaction, etc. In some embodiments, digital wallet component 512 may further be configured to (i) execute code that causes the system to generate, transmit, record, terminate, requests validation, or reissues a BC check in connection with a payer and/or payee's digital wallet, and/or refund, release, receive, transfer, lock, and/or send an amount of digital currency to another network participant's digital wallet. In some embodiments, digital wallet component 512 may further be configured to execute code to provide balance reporting after one or more transactions has occurred involving digital currency and/or after a BC check used in a transaction has been cashed out. In some embodiments, the digital wallet component 512, which may be accessible or viewable via a user device or other device within the blockchain networking environment. In some embodiments, digital wallet component 512 may further be configured to facilitate back-up (e.g., periodic back-up, on demand back-up, or one-time back-up) for later restoration by the associated network participant as needed (e.g., if the given network participant loses their smartphone hosting the digital wallet app (e.g., loses their UNode)).

In some embodiments, the digital wallet component 512 may, alone or in combination with other components, be configured to transmit a request to the relevant blockchain to validate a BC check (e.g., validate that the amount the BC check is written for can be satisfied by the accounts to which the BC check is linked). In some embodiments, before validating a BC Check with the relevant blockchain, the checkholder's UNode 502 may perform a pre-validation operation wherein one or more components of the UNode first determines if the checkholder's accounts includes sufficient funds (e.g., in credit account(s) and/or debit account(s) linked to the BC check and/or digital wallet). In the event that the BC Check fails the pre-validation operation (e.g., for being in an amount that is in excess of the available funds), the BC check payment process may be discontinued without imposing the computational burden of a bound-to-fail validation request to the relevant blockchain. In the event that the BC Check passes the pre-validation operation, the BC Check payment process may continue.

In some embodiments, though not required in any given implementation, a UNode of the present disclosure may include any one or more features disclosed herein, be configured to cause the execution of any one or more features disclosed herein, and/or be configured with any one or more of the features and functionality discussed with respect to UNodes in U.S. Application Ser. No. 16/820,661, which are incorporated herein by reference in their entirety.

BC check component 514 may, alone or together with Digital Wallet Component 512, be configured to enable a UNode to write and/or generate a BC check as a form of payment to be transferred to other network participants (e.g., other UNodes) as part of a transaction. In some embodiments, the BC check is an electronic check that can be transmitted and validated by the blockchain itself. In some embodiments, prior to allowing the BC check to be transmitted/transferred to another network participant, the UNode and/or associated INode (via the BC check component 214, 514 or otherwise) may coordinate with financial institutions associated with the payee network participant to ensure the amounts of funds needed to support the BC checks are locked, held, frozen, or otherwise restricted from further use to avoid double spending and bounced check issues. The BC check may be configured to support payments in the form of fiat-currency and/or digital currency. The BC check of the present disclosure is different from conventional checks in that, for example, (1) in the case of digital BC checks, it may exist in an electronic form that is secured by blockchain verification/validation/authentication technology including the technologies of the present disclosure, (2) it may be written for both or either of fiat-currency and/or digital currency, (3) it can be pre-validated and pre-authorized before being transferred as part of a payment procedure, (4) it may nullify or reduce the risk of being bounced when cashed by the recipient (5) it may prevent the checkholder from double-spending the same funds, (6) it can be traceable, (7) it can be terminable in the event of loss or misuse, (8) it can be replaceable in the event of loss, (9) it may require fewer authorization/validation steps before being cashed, and involves fewer entities for the same purpose, etc. (e.g. it is unnecessary for the payee's bank to be involved in the validating and/or cashing of the BC check), (10) it enables a faster cashing out processes whereby recipients gain access to funds more quickly, (11) for digital BC checks, there can be an unlimited number of BC checks generated without requiring printed checks to be sent to you from the check issuing bank, (12) it enables lower processing costs due to fewer parties involved in validation and fewer computational resources used to accomplish cashing out, (13) it enables more robust stop payment handling, (14) it enables enhanced transferability and/or re-use of received BC checks, e.g., as a form of payment to any N levels of recipients, (15) it enables better fraud prevention (e.g., via biometrics), (16) it enables BC checks to be criteria specific such that they can be configured to only be used in transactions/situations that satisfy predefined criteria (e.g., to be used for specific purpose, to be sent to a specific payee, etc.), (17) it enables the issuing bank (the bank that issued the BC check) to, for example, establish a relationship with a payee that may not yet have an account with such issuing bank. Significantly, by offering payment in the form of a BC check, a user may transfer a BC check to a recipient that designates an amount of either or both fiat-currency or digital currency, and a recipient may cash the BC check directly with payer's bank while avoiding a series of processes commonly performed by financial institutions in connection with cashing traditional checks.

For example, in the traditional checking environment, if a first person ("Person A1") writes a check to a second person ("Person B1"), when Person B1 goes to his/her banking institution ("Bank B") to cash the check, Bank B must communicate and coordinate with Person A1's bank ("Bank A") to determine whether or not Person A1 actually has access to a sufficient amount of fiat funds to cover the amount of the check that was written (i.e. sufficient funds to support the transfer of funds from Person A1's account to Person B1 as detailed on the check). Bank B must engage in a series of steps (which can include third party authentication steps) in connection with both the issuer of the check (Person A1) and the recipient of the check (Person B1) in order to execute the transaction detailed on the check. Sometimes the back-and-forth interactions between banking institutions in the traditional check scenario is referred to as "clearing" (e.g., Bank B clears the check with Bank A, and then receives the funds for Person B1 from Person A1's account at Bank A). In the blockchain networking environment of the present disclosure, if a user of a UNode issues a BC check to another UNode, a number of the interactions required between banking institutions in the traditional checking scenario can be avoided and the overall process streamlined.

In some embodiments, other component(s) 518 of UNode 500-1 may be configured to implement various other features desirable in the given environment. For example, in some contexts it will be desirable for the UNode to communicate to relevant INodes various updates concerning completion of a transaction or other metrics associated with a given transaction. For example, UNode 500-1 may send notices and/or otherwise communicate and/or facilitate updates to one or more INodes after a transaction has been completed using a BC check, or communicate and/or facilitate transaction details and/or statistics for/to each of the other UNodes that participated in a particular transaction, for example, the status of the validation, processing, and/or recording of the transaction. UNode 500-1 may communicate (to the relevant INodes and/or the other UNodes that are parties to a certain transaction) the date/time the transaction was initiated, confirmed, validated, completed, etc.

In some embodiments, though not required in any given implementation, an UNode of the present disclosure may include any one or more features disclosed herein, be configured to cause the execution of any one or more features disclosed herein, and/or be configured with any one or more of the features and functionality discussed with respect to INodes in U.S. application Ser. No. 16/820,661, which is incorporated herein by reference in its entirety.

As further shown in FIG. 2, UNode 500-1 may be comprise or otherwise be operatively coupled with a display 520, a processing device 530, and a network interface 540. Display 520 may be any digital display that displays visual information based on instructions executed by a processor connected thereto. For example, display 520 may include touchscreen displays, computer monitor displays, television displays, etc. Processing device 530 may include one or more processors that performs processing operations or a combination of specialized and/or general-purpose processors that perform processing operations. For example, processing device 530 may include a CPU, GPU, APU, DSP, FPGA, ASIC, SOC, and/or other processing circuitry. Network interface 540 may be any communication circuit configured for communicating over a wired or wireless network. Network interface 540 provides a two-way data communication through networks 414, 412, and/or 410 over one or more communication links 450 (FIG. 1). For example, network interface 540 may be an integrated services digital network (ISDN) card, cable modem, satellite modem, a cellular chipset, or a modem to provide a data communication connection to a corresponding type of communication line. As another example, network interface 540 may be a local area network (LAN) card to provide a data communication connection to a compatible LAN (or WAN component to communicated with a WAN). Network interface 540 may send and receive electrical, electromagnetic, optical or other signals that carry digital data streams representing various types of information. It will be appreciated that one or more of display 520, processing device 530, and network interface 540 may be embodied in any type of computing device (e.g., a smartphone).

Referring now to FIG. 3, INode 200-1 may include a machine readable medium 210 having instructions stored thereon, which, when executed by one or more processors, cause one or more of the disclosed features to be effectuated. The machine readable medium may have machine readable code comprising a Blockchain Component 213, Digital Wallet Component 214, a BC Check Component 216, and/or one or more Other Component(s) 218.

Blockchain component 213 may be configured to host a blockchain that validates and/or approves a BC Check, processes a transaction supported by a validated and/or approved BC check transferred from a payer network participant to a payee network participant, and/or records a transaction supported by a validated and/or approved BC check transferred from a payer network participant to a payee network participant. In some embodiments, blockchain component 213 may cause the blockchain to validate a BC check based on the blockchain record (including a BC check record identifying BC checks written, generated, transferred, confirmed, and/or cashed out in connection with a transaction on the blockchain supported transaction network) and/or the account information associated with the checkwriter's accounts linked to the BC check. In some embodiments, when a BC check is generated, the INode and/or the UNode informs the associated blockchain about the BC check amount, the identity of the payer (e.g., name, wallet ID, bank account #, bank routing number, physical address, check ID, date, etc.), the identity of the payee info (e.g., name, wallet ID, bank account #, bank routing number, physical address, check ID, date, etc.). In some embodiments, when payer pays a payee, the blockchain validates the transaction information together with payer's authorization (e.g., a digital or biometrics signature); and, after the BC check has been transferred to the payee, the blockchain is updated to reflect that the payee is now the checkholder (and to reflect that the original payer is no longer the checkholder). In some embodiments, where the original payee utilizes the BC check to either pay another third party and/or to cash out the check from the issuing bank, the blockchain will also be updated to reflect the changed "checkholder" and/or the changed check status (e.g., as cashed out, stopped, canceled, floating, alive/active, re-written, etc.).

Blockchain component 213 may (alone or together any other INode component and/or UNode component) be configured to authenticate a user using stored or otherwise accessible authentication information (e.g., biometric information, PIN numbers, Wallet ID). Blockchain component 213 may (alone or together any other INode component and/or UNode component) be configured to receive, collect, store, compare, and/or distribute biometric information (e.g., fingerprint information, retinal information, facial feature information, voice information, other biometric features) for one or more users to enable verification comparisons to enable such authentication. In such embodiments, authentication information may enhance privacy and detect/prevent attempted fraudulent activity. It should be noted that biometrics information for network participants may be stored (i) directly within the blockchain such that authentication initiated by blockchain component 213 (or another INode component and/or UNode component) may be performed by and/or based on the information stored in the blockchain, and/or (ii) locally within an INode such that authentication initiated by blockchain component 213 (or another INode component and/or UNode component) may be performed by and/or based on the information stored in the INode (iii) locally within a UNode such that authentication initiated by blockchain component 213 (or another INode component and/or UNode component) may be performed by and/or based on the information stored in the UNode.

Blockchain component 213 may be further configured to host and/or add blocks to a blockchain maintaining a record of one or more transactions validated and/or processed by the blockchain and/or completed by the associated parties to such transactions, and/or a BC check record identifying BC checks written, generated, transferred, confirmed, and/or cashed out in connection with a transaction on the blockchain supported transaction network. In some embodiments, blockchain component 213 may be configured to build and/or host its own blockchain (e.g., a private blockchain holding a record of transactions and BC check records of the members of the bank associated with the INode). In some embodiments, blockchain component 213 may be configured to build and/or host a blockchain together with a number of other INodes whose associated banking institutions have formed a bank consortium (aka an INode consortium) to enable extended validation, processing, and recording capabilities for a greater number of transactions (e.g., a private blockchain distributed across any number of INode computing devices of banking institutions within the consortium, where the private blockchain holds a record of transactions and BC check records (which may include the status, e.g., lost, floating, canceled, stolen, transferred, written, cashed out, terminated, expired, etc.) of the members of each of the banking institutions within the consortium) between a greater number of participants. In some embodiments, blockchain component 213 may be configured to build and/or host its own blockchain for one purpose, and may also be configured to build and/or host a blockchain together with a number of other INodes whose associated banking institutions have formed a bank consortium for another purpose.

In some embodiments, even where an INode is only responsible for hosting a portion of a blockchain hosted in its entirety by an INode consortium, one or more (or all) of the INodes in an INode consortium may maintain a copy of the entire blockchain (which may be updated on a periodic or continuous basis). In this way, and as explained further herein, a proposed transaction (involving a checkholder that is an account holding member with at least one banking institution that is a member of the consortium) may be validated, processed, and/or recorded by the blockchain hosted in whole or in part by any INode within the consortium, not just the INode corresponding to the banking institution with whom the checkholder holds a bank account.

Digital wallet component 214 may be configured to host one or more digital wallets linked to one or more accounts held by the bank associated with INode 200-1. Additionally, although unnecessary in many embodiments where individual UNodes host their own digital wallets, digital wallet component 214 may be also configured to host one or more digital wallets of UNodes of network participant's that have accounts with the bank associated with INode 200-1. In some embodiments where digital wallet component 214 is configured to host one or more digital wallets of a UNode, the digital wallet component 214 may be further configured to provide or otherwise cause such information to be displayed or made available in some form on a display of the corresponding UNode. Indeed, in some embodiments, the UNode may have a mobile app or desktop app provides an interactive view of the digital wallet and can be used by the UNode in similar fashion as though the UNode were hosting the digital wallet itself. When digital currency movements occur in such scenarios, however, the INode 200-1 will ultimately instigate and facilitate the movement of BC checks between wallets on the back-end (instead of the UNode instigating and facilitating the movement of BC checks between wallets on the client side, which occurs when the UNode hosts its own digital wallet instead of or in addition to the INode).

Digital wallet component 214 may be configured to (alone or together with one or more components of INode 200-1 and/or one or more components of appropriate UNodes) move BC checks between digital wallets and linked accounts pursuant to proposed transactions or requested exchanges. For example, digital wallet component 214 may be configured to effectuate a transfer of a BC checks from one digital wallet into another, and/or to effectuate an exchange of fiat or digital currency for a BC check, and/or to effectuate deposits, withdrawals, and so on in connection with digital wallets and/or the accounts linked thereto (e.g., deposit accounts, credit accounts, check accounts, etc.).

In some embodiments, a digital wallet on an INode and/or a UNode may comprise a mobile (e.g., iOS or Android based) or desktop (e.g., PC or Mac based) app that stores one or more BC checks. BC checks may (i) be linked to accounts held at different issuing banks (ii) comprise or have access to one or more entity-specific with any currency designation (US, European, Chinese, Canadian, etc.). A digital wallet stores the various BC checks it receives from other digital wallets (e.g., facilitated by respective digital wallet components) and may be utilized to pay or otherwise transfer BC checks to other network participants (including other banks such as issuing banks). A digital wallet component may be configured to operate a digital wallet application configured to store, pay and/or receive different digital currencies issued by various central banks, and further to store a user identification object (e.g., a photo, a name, an avatar, a thumbnail, or other user ID object associated with the owner of the digital wallet), a wallet address (sometimes referred to herein as a Wallet ID). The digital wallet application may, as described further herein, intelligently select the best payment method (e.g., select among a plurality of optional BC checks) for a given transaction. A digital wallet can further be configured to receive receipts, enter data, provide endorsements (e.g., signatures), scan codes, and/or receive feedback as to whether or not a BC check payment for a proposed transaction was successful or failed.

Digital wallet component 214 may (alone or together any other INode component and/or UNode component) be configured to authenticate a user using stored or otherwise accessible authentication information (e.g., biometric information, PIN numbers, Wallet ID). Digital wallet component 214 may (alone or together any other INode component and/or UNode component) be configured to receive, collect, store, compare, and/or distribute biometric information (e.g., fingerprint information, retinal information, facial feature information, voice information, other biometric features) for one or more users to enable verification comparisons to enable such authentication. In such embodiments, authentication information may enhance privacy and detect/prevent attempted fraudulent activity. It should be noted that biometrics information for network participants may be stored (i) directly within the blockchain such that authentication initiated by digital wallet component 214 (or another INode component and/or UNode component) may be performed by and/or based on the information stored in the blockchain, and/or (ii) locally within an INode such that authentication initiated by digital wallet component 214 (or another INode component and/or UNode component) may be performed by and/or based on the information stored in the INode (iii) locally within a UNode such that authentication initiated by digital wallet component 214 (or another INode component and/or UNode component) may be performed by and/or based on the information stored in the UNode.

In some embodiments, digital wallet component 214 may further be configured to facilitate back-up (e.g., periodic back-up, on demand back-up, or one-time back-up) for later restoration of such digital wallet by the associated network participant as needed (e.g., if the given network participant loses their smartphone hosting the digital wallet app (e.g., loses their UNode)).

Other component(s) 218 of INode 210 may be configured to implement various other features desirable in the given environment. For example, in some contexts it will be desirable for the INode to communicate to relevant UNodes various updates concerning completion of a transaction or other metrics associated with a given transaction. For example, INode 200 may communicate and/or facilitate updates to the digital currency or fiat balances in respective digital wallets during or after a transaction has been completed using a BC check, or communicate and/or facilitate transaction details and/or statistics for/to each UNode that participated in a particular transaction. For example, the status of the validation, processing, and/or recording of the transaction, INode 200 may communicate (to UNodes that are parties to a certain transaction) the date/time the transaction was completed, etc.

In some embodiments, though not required in any given implementation, an INode of the present disclosure may include any one or more features disclosed herein, be configured to cause the execution of any one or more features disclosed herein, and/or be configured with any one or more of the features and functionality discussed with respect to INodes in U.S. application Ser. No. 16/820,661, which is incorporated herein by reference in its entirety.

BC check component 216 may, alone or together with other components of INode 200-1 and/or UNode 500-1, be configured to issue BC checks to enable a UNode to write and/or generate a written BC check as a form of payment to be transferred to other network participants (e.g., other UNodes) as part of a transaction. In some embodiments, the BC check is an electronic check that can be transmitted and validated by the blockchain itself. In some embodiments, prior to allowing the BC check to be transmitted/transferred to another network participant, the UNode and/or associated INode (via the BC check component 216, 514 or otherwise) may coordinate with financial institutions associated with the payer network participant to ensure the amounts of funds needed to support the BC checks are locked, held, frozen, or otherwise restricted from further use to avoid double spending and bounced check issues. The BC check may be configured to support payments in the form of fiat-currency and/or digital currency. The BC checks of the present disclosure are different from conventional checks in that, for example, (1) in the case of digital BC checks, it may exist in an electronic form that is secured by blockchain verification/validation/authentication technology including the technologies of the present disclosure, (2) it may be written for both or either of fiat-currency and/or digital currency, (3) it can be pre-validated and pre-authorized before being transferred as part of a payment procedure, (4) it may nullify or reduce the risk of being bounced when cashed by the recipient, (5) it may prevent the checkholder from double-spending the same funds, (6) it can be traceable, (7) it can be terminable in the event of loss or misuse, (8) it can be replaceable in the event of loss, (9) it may require fewer authorization/validation steps before being cashed, and involves fewer entities for the same purpose, etc. (e.g. it is unnecessary for the payee's bank to be involved in the validating and/or cashing of the BC check), (10) it enables a faster cashing out processes whereby recipients gain access to funds more quickly, (11) for digital BC checks, there can be an unlimited number of BC checks generated without requiring printed checks to be sent to you from the check issuing bank, (12) it enables lower processing costs due to fewer parties involved in validation and fewer computational resources used to accomplish cashing out, (13) it enables more robust stop payment handling, (14) it enables enhanced transferability and/or re-use of received BC checks, e.g., as a form of payment to any N levels of recipients, (15) it enables better fraud prevention (e.g., via biometrics), (16) it enables BC checks to be criteria specific such that they can be configured to only be used in transactions/situations that satisfy predefined criteria (e.g., to be used for specific purpose, to be sent to a specific payee, etc.), (17) it enables the issuing bank (the bank that issued the BC check) to, for example, establish a relationship with a payee that may not yet have an account with such issuing bank. Significantly, by offering payment in the form of a BC check, a user may transfer a BC check to a recipient that designates an amount of either or both fiat-currency or digital currency, and a recipient may cash the BC check directly with payer's bank while avoiding a series of processes commonly performed by financial institutions in connection with cashing traditional checks. Other Component(s) 218 of INode 200-1 may be configured to implement various other features desirable in the given environment. For example, in some contexts it will be desirable for the INode to communicate to relevant UNodes various updates concerning completion of a transaction or other metrics associated with a given transaction. For example, INode 200-1 may communicate and/or facilitate updates to the digital currency or fiat balances pursuant to the transaction completed using a BC check, or communicate and/or facilitate transaction statistics for/to each UNode 500-1 that participated in a particular transaction involving a BC check.

Referring back now to FIGS. 1A-1C with the context of the componentry of UNodes and INodes discussed with reference to FIGS. 2-3, UNode 510 may be associated with a person, Person A1, who wishes to make a payment using a BC check to Person B1, who is associated with UNode 540. Among other components, one or more of UNode 510 and UNode 540 may be equipped with a Digital Wallet Component and or BC check component such as Digital Wallet Component 512 and BC check component 514 introduced in connection with the example UNode 500-1 of FIG. 2. The Digital Wallet Component 512 and/or BC check component 514 of UNode 510 may, alone or together, be configured to generate an interface with editable fields and selectable options whereby Person A1 may enter the details (e.g., the amount of fiat-currency or digital currency the BC check is to be issued for, the account from which the amount is to be drawn, an issuance date, an expiration date, a date range within which the BC check may be remitted or paid out, the name or other identifier associated with the person/entity to whom the check is to be directed, other limitations or restrictions as may be specified by the issuer, etc.) of an BC check they wish to generate and subsequently issue to someone (e.g., to Person B1 via UNode 540) over a blockchain network in connection with one or more embodiments of the present disclosure.

In some embodiments, the BC check component 514 and/or Digital Wallet Component 512 of UNode 510 may prevent the generation and/or issuance of a BC check if one or more prerequisites are not satisfied. Satisfaction of such prerequisites may be determined by one or more components of UNode 510 prior to commencing the generation and/or issuance of a BC check. Such prerequisites may include: (1) sufficient funds available to the user associated with UNode 510 to support the BC check that the user has requested be generated and/or issued, and/or (2) sufficient authentication of the user attempting to make the request for the generation and/or issuance of a BC check, and/or (3) sufficient creditworthiness if the amount of the BC check requested would draw upon a line of credit, and the like.

In some embodiments, BC check component 514 and/or Digital Wallet Component 512 of UNode 510, alone or in combination with other components 518 of the UNode and/or and associated INode, be configured to transmit a request to the relevant blockchain to validate a BC check (e.g., validate that the amount the BC check is written for can be satisfied by the accounts to which the BC check is linked). In some embodiments, before validating a BC Check with the relevant blockchain, the checkholder's UNode 510 may perform a pre-validation operation wherein one or more components of the UNode first determines if the checkholder's accounts includes sufficient funds (e.g., in credit account(s) and/or debit account(s) linked to the BC check and/or digital wallet). In the event that the BC Check fails the pre-validation operation (e.g., for being in an amount that is in excess of the available funds), the BC check payment process may be discontinued without imposing the computational burden of a bound-to-fail validation request to the relevant blockchain. In the event that the BC Check passes the pre-validation operation, the BC Check payment process may continue.

For example, if Person A1 makes a request (e.g., by writing a BC check via its UNode 510) to generate a BC check in the amount of 200 digital currency to be sent to Person B1's UNode 540, one or more components of UNode 510 and/or INode 210 may first check Person A1's bank account balance (e.g., which may be available to or accessible via the digital wallet of the UNode 510 and/or INode 210) to determine whether there is at least 200 digital currency or fiat currency available for Person A1 to transfer. If there are sufficient funds available in the user's accounts, or there is an amount of fiat currency in the user's bank account (which may or may not be reflected in and accessible via the user's digital wallet)), INode 210 may authorize the request and one or more components of UNode 510 may generate the BC check in the amount of 200 digital or fiat currency for the anticipated transmission to UNode 540 (e.g., transferred to the digital wallet of Person B1's UNode 540).

In another example, if Person A1 makes a request via its UNode 510 to generate a BC check in the amount of $350 US Dollars to be sent to Person B1's UNode 540, one or more components of UNode 510 and/or INode 210 may first check Person A1's bank account balance (e.g., which may be available to or accessible via the digital wallet of the UNode 510 and/or INode 210) to determine whether there is at least $350 US Dollars available (or, in some embodiments, to determine whether there is at least an equivalent amount of digital currency available that could be exchanged for $350 US Dollars at a predetermined exchange rate) for Person A1 to transfer. If there are sufficient funds available (e.g., if there are at least $350 US Dollars in the user's account, or there is at least $350 US Dollars in the user's bank account (which may or may not be reflected in and accessible via the user's digital wallet)), INode 220 may authorize the request and one or more elements of the system may generate the BC check in the amount of $350 US Dollars for the anticipated transmission to UNode 540 (e.g., transferred to the digital wallet of Person B1's UNode 540).

In another example, if Person A1 makes a request via its UNode 510 to generate a BC check in the amount of $100 US Dollars and 250 digital currency to be sent to Person B1's UNode 540, one or more components of UNode 510 and/or INode 210 may first check Person A1's bank account balance (e.g., which may be available to or accessible via the digital wallet of the UNode 510 and/or INode 210) to determine whether there is at least (i) 250 digital currency available (or, in some embodiments, to determine whether there is at least an equivalent amount of fiat-currency available that could be exchanged for 250 digital currency at a predetermined exchange rate) for Person A1 to transfer, and, in addition to (i), to determine that (ii) there is another $100 US Dollars available (or, in some embodiments, to determine whether there is an additional equivalent amount of digital currency available that could be exchanged for $100 US Dollars at a predetermined exchange rate). If there are sufficient funds available to satisfy both (i) and (ii) (e.g., if there are at least 250 digital currency and $100 US Dollars in the user's account, or there is an amount of fiat currency or digital currency in the user's bank account (which may or may not be reflected in and accessible via the user's digital wallet)), UNode 540 may authorize the request and one or more elements of the system may generate the BC check in the amount of 250 digital currency and $100 US Dollars for the anticipated transmission to UNode 540 (e.g., transferred to the digital wallet of Person B1's UNode 540). In some embodiments, one or more elements of the blockchain network of the present disclosure may prohibit and prevent the UNode from writing and/or generating BC checks for amounts of fiat-currency and/or amounts of digital currency that exceed the amount available to the user through the account(s) (e.g., bank account(s)) from which the funds are to be drawn. For example, the UNode may be equipped with a local utility that prevents the UNode from writing checks for amounts of digital currency that exceed the amount held in the user's bank account that is associated with the requesting UNode (which may, in some embodiments, be available to and/or accessible from the requesting UNode's digital wallet). Moreover, once a check is generated and/or issued in connection with UNode's request, one or more elements of the blockchain network of the present disclosure may lock up the amount of digital currency and/or fiat-currency that the issued check calls for such that the user of the requesting UNode cannot double spend. For example, a UNode and/or an INode may include a local utility that locks up the amount of digital currency and/or the amount of fiat-currency in the user's accounts in the amount that the written BC check calls for such that a user of the UNode cannot double spend. In some embodiments, the UNode may communicate with the bank account of the user associated with the UNode for this purpose.

For example, as part of the BC check generation process, or as part of a process following such check generation process, one or more elements of the blockchain supported networks of the present disclosure (e.g., UNode 510, INode 210) may lock the number of digital currency and/or lock the fiat-cash in Person A1's accounts that are needed to support the check being generated such that the same funds cannot be used to support another note or transaction. For instance, upon Person A1's request for a BC check to be written via the blockchain network of the present disclosure, the smart wallet component (alone or together with other components) of UNode 510 may (alone or in coordination with the banking institution that hosts Person A1's bank account) transfer into an escrow account the number of digital currency and/or fiat-currency needed to support the BC check. In another example, the digital wallet component 214 of INode 210 locks up or otherwise freezes the digital currency and/or fiat-currency needed to fulfill the BC check such that the digital currency and/or fiat-currency cannot be used, moved, or otherwise transferred to another source unless and/or until the BC check is canceled, destroyed, expires, stopped or is otherwise disabled prior to being sent to and/or cashed by the intended recipient of the BC check (e.g. Person B1).

In some embodiments, locking digital currency imposes one or more restrictions on the digital currency such that they cannot be used, moved, or otherwise transferred to another source absent the performance of a predefined action that causes a release of such restriction. In some embodiments, locking digital currency may involve embedding additional code within the code that defines the digital currency, the additional code restricting the ability of the particular digital currency within which it is embedded from being used other than for the BC check to which they are associated. In some embodiments, locking fiat-currency imposes one or more restrictions on an amount of fiat-currency such that the amount of fiat-currency cannot be used, moved, or otherwise transferred to another source absent the performance of a predefined action that causes a release of such restriction. In some embodiments, locking fiat-currency may involve (i) moving the fiat-currency in the user's bank account (or in the user's digital wallet) into an escrow account that is inaccessible to the issuing user, and/or (ii) coordinating with the banking institution hosting the user's bank account such that the banking institution freeze the amount of fiat-currency for all purposes other than for supporting the BC check issued by the user (e.g., coordinating with the banking institution such that the institution will not allow the funds to be used in any manner except that the recipient of the BC check may cash the BC check and obtain the funds).

In still further embodiments, one or more elements of the blockchain network of the present disclosure may prohibit and prevent the UNode from writing and generating BC checks over a certain predefined amount of fiat-currency and/or amount of digital currency, regardless of how much funds the user may have in their accounts. For example, the UNode may be equipped with a local utility that prevents the UNode from issuing BC checks for amounts over $10,000 US Dollars, thereby further limiting exposure in the event of some attempted fraud.

As such, extending the example above, upon submission of BC check details via Person A1's UNode 510, UNode 510 may generate a BC check that may be issued and sent (automatically or upon further user selection) to the network participant that is the intended recipient, i.e., Person B1. Person B1's UNode 540 may receive the BC check. Upon receipt of the BC check from UNode 510, UNode 540 may generate and/or display a notification indicating receipt of the BC check. In some embodiments, BC checks may be located in (or represented as being located within) a digital wallet of a UNode, in connection with FIG. 2. Thus, in some embodiments a digital wallet component of a UNode (e.g., digital wallet component 512 of example UNode 500-1 of FIG. 2) may operate together with the BC check component of the UNode (e.g., BC check component 514 of example UNode 500-1 of FIG. 2) to perform operations for the writing, generation, storage, recovery, transmission, receipt, confirmation, and/or endorsement of such BC checks.

Once Person B1 (via their UNode 540) is in receipt of the BC check, Person B1 may wish to obtain the funds delineated by the BC check. Person B1 (now in possession of the BC check) may present, send or otherwise transmit the BC check (together with Person B1's account details at their own banking institution) to Bank A in order to cash the check. That is, once the BC check from UNode 510 has been received by UNode 540, UNode 540 may obtain the funds associated with the BC check by submitting the BC check directly to Person A1's bank (Bank A) together with Person B1's account details (account/iban number, Swift code/routing number) at their own banking institution where they wish the funds to be transferred (here, Bank B). Using Person B1's account details, Bank A may then deposit the amount of funds (either in digital currency or in fiat currency or both) directly into Person B1's account at Bank B. It should be noted that Bank A and Bank B in the above examples may also be associated with nodes of the blockchain network of the present disclosure, and may be equipped with a digital wallet managed by one or more components of such nodes (e.g., a digital wallet managed by a smart wallet component and/or wallet interaction component in the case of either an INode or a Unode associated with the Bank).

Note that in the foregoing example scenario, Person B1 may cash the BC check through Bank A such that the funds are transferred to Person B1's account at Bank B without Person B1 ever directly contacting Bank B and without Bank B ever having to "clear" the check with Bank A. Utilizing the BC checks of the present disclosure, pre-authenticated and pre-validated digital currency transfers may be made from a BC Check issuing banks to a recipient bank without the recipient bank and the BC Check issuing bank having to engage in a number of authentication steps prior to the BC Check issuing bank transferring the funds to the recipient bank. This is unlike the traditional model where, upon receiving a check a person will visit their own bank first (or another bank that is not the bank of the person who issued the check (i.e., the issuing bank)), who will then communicate with the bank of the person who issued the check.

Accordingly, in embodiments of the present disclosure that support BC based checking, the banking institution associated with a network participant need not conduct the steps associated with traditional check clearing in connection with another network participant's banking institution. This is enabled, in part, because one or more nodes of the blockchain network described herein: (1) have concurrent knowledge of (i) the amount of funds (e.g., fiat or digital currency) available to or held within the associated users' bank accounts (which may or may not be reflected in the user's digital wallet), (ii) authorized check information and/or (ii) the amount of funds in the associated users' accounts and/or (iii) the exchange rate at which digital currency and fiat currency may be exchanged back and forth; and (2) are configured to optionally impose restrictions on the transferability of such funds (e.g., coordinating the freezing of fiat-currency, and/or the lock up of digital currency) in connection with BC check generation and/or issuance. The technology of the present disclosure thus ensures that when a UNode is in receipt of a BC check of a particular amount, the user associated with the recipient UNode can, without worry or risk of having received a bad check, proceed to cash the BC check with confidence that it will be funded in full from the appropriate source. Thus, among other things, the "insufficient funds" and "bounced checks" problems of conventional checking mechanisms are entirely avoided, and no one network participant can engage in fraudulent checking activities one person while awaiting the "clearing" process for a check the user issued to another person.

Figure 4:
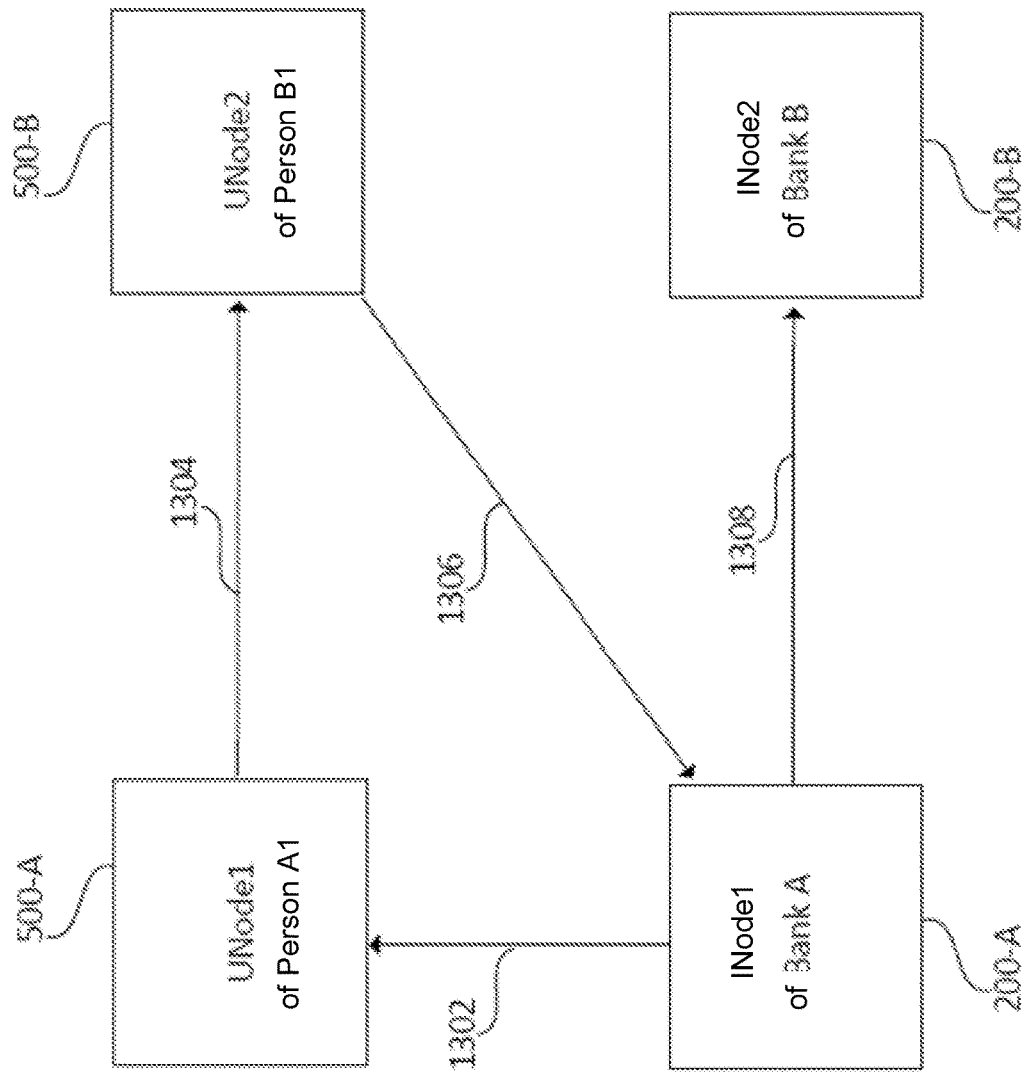
FIG. 4 is an operational flow diagram illustrating an example process that may be implemented in accordance with one or more embodiments of the present disclosure.

Referring to the example illustrated in FIG. 4, which depicts a symbolic diagram of Person A1 (a payer network participant) sending a BC check to Person B1 (a payee network participant), the digital wallet component and BC check component of UNode 1 500-A may generate a BC check in response to the input provided by Person A1 via UNode1 500-A. In some embodiments, to achieve this, Person A1 initiates (e.g., via a digital wallet hosted in UNode1 500-A) a check writing process and inputs transaction details that it desires to be included in a BC check. After UNode1 500-A requests that a BC check be generated, but prior to generating the BC check, one or more components of the blockchain supported transaction network of the present disclosure may, alone or in coordination with other entities/components (e.g., the user's banking institution), validates and approves the BC check for use by Person A1 in a proposed transaction. In some embodiments, to achieve this Bank A will (via one or more components of the systems disclosed herein) perform a validation and/or approval operation wherein it determines if UNode1 500-A has access to enough funds to support the BC check requested to be generated and/or communicate the result of the determination to another entity/component of the system. For example, in some embodiments, INode 1 200-A of Bank A may determine if UNode1 500-A has access to enough funds to support the BC check requested to be generated, and may communicate the result of the determination to UNode1 500-A. An example of such a determination and/or communication of the result is denoted by arrow 1302 in FIG. 4, where Bank A (via its INode) determines if there are sufficient funds support the BC check requested to be generated and/or providing UNode1 500-A with the result of the determination (and/or, in relatively less secure embodiments, providing UNode1 500-A with the information UNode1 500-A would need to make the determination locally). If sufficient funds exist, the BC check will be generated and any limitations on the transferability of the BC check may be removed such that Person A1 may (via UNode1 500-A) transfer the BC check to the intended recipient. In some embodiments, Bank A (via its INode 200-A) will cause the blockchain hosted in whole or part by Bank A's INode 200-A to create a record of the generated BC check. In some embodiments, the BC check may be reflected in the digital wallet of UNode1 500-A until it has been transmitted, transferred, or otherwise sent to UNode2 500-B where it may then be reflected in the digital wallet of UNode2 500-B. An example of such transmission/transfer of the BC check from UNode1 500-A to UNode2 500-B is denoted by arrow 1304 (e.g., the BC check is sent from the digital wallet of UNode1 500-A to the digital wallet of UNode2 500-B). Thereafter, UNode2 500-B may cash out the BC check by sending it, together with the Person B1 bank account details (e.g., Person B1's routing and account number at Bank B, or any other form of identification that corresponds to the Person B1's bank account wherein the deposit of fiat currency corresponding to the BC check is desired), to Bank A and/or its INode (INode1 200-A). An example of such a cash out transmission is indicated by arrow 1306 (e.g., the BC check is sent from the digital wallet of UNode2 500-B to the INode1 200-A). Responsive to the operation denoted by arrow 1306, Bank A (via its INode or otherwise) may then transfer, directly or indirectly, the funds designated by the BC check to the bank account at Bank B (via its INode or otherwise) that corresponds to Person B1's bank account details. An example of such a transfer of funds from Bank A (via its INode or otherwise) to Bank B (via its INode or otherwise) for purposes of depositing such funds into the bank account at Bank B (via its INode or otherwise) that corresponds to Person B1's bank account details is denoted by arrow 1308 in FIG. 4. In some embodiments, Bank A (via its INode 200-A) will notify the blockchain hosted in whole or in part by INode 200-A of any and all of the steps in the foregoing process (e.g., of BC check approval/validation, of BC check generation, of BC check transfer, of BC check cash out, etc.). In some embodiments, Bank A (via its INode 200-A) may further notify the blockchain hosted in whole or in part by INode 200-A of any other occurrences that may interrupt the aforementioned process (e.g., of a lost status of a BC check, of a stolen status of a BC check, of a canceled action in connection with a BC check, etc.).

Because the aforementioned BC checks may exist in or be reflected within the digital wallet of the user who holds the BC check at any given time, and because the digital wallet of the user is typically maintained on a mobile device (e.g., a smartphone) can be on desktop, laptop, pads or servers, it is possible that a user in control of a BC check misplaces or otherwise loses their digital wallet before transmitting and/or cashing the BC check. In this event, the recipient of the BC check (i.e., the entity who lost their digital wallet) may notify the sender of the BC check (e.g., by email or by phone, or a secure alert web application). The sender of the BC check may send a copy of the canceled BC check to its financial institution (e.g., over the blockchain network). Thereafter, the sender's financial institution may compare the received copy of the canceled BC check with a previously stored copy of the BC check and, upon a verification, proceed to cancel the BC check and release any lock, freeze or other restriction on the corresponding funds such that the funds are re-accessible to the sender. The sender's financial institution may flag, mark, or otherwise provide a status indicator to the blockchain hosted in whole or in part by the INode of the sender's financial institution denoting the canceled status of the BC check. In some embodiments, the sender's digital wallet may similarly impose or reflect a flag, mark, or otherwise provide a status indicator denoting the canceled status of the BC check.

It is further possible that both the sender and the recipient lose their digital wallets prior to a BC check being cashed. In such a case, the sender can contact its financial institution to cancel the BC check and either or both (i) release the locked digital currency back to the sender, e.g., release them back into the sender's replacement digital wallet, and/or (ii) lift the freeze on the frozen fiat-currency, and/or (iii) release escrowed funds (either escrowed fiat currency or escrowed digital currency) back into the sender's respective accounts, etc. In embodiments of the present technology, a financial institution may be associated with an INode or a UNode that, through one or more components, may coordinate with users who have lost their digital wallet containing devices, and may restore some or all copies of any previously cashed, uncashed, or canceled BC checks (with their corresponding status) to a new device acquired by the user. In this way, financial institutions registered with the blockchain network can provide restoration services to their members in order to restore appropriate BC checks to appropriate network participants (e.g., into appropriate digital wallets hosted by new devices of the network participants), should an event occur where a device hosting a digital wallet is misplaced, lost, damaged, stolen, or otherwise removed from the control of the authorized user. In some embodiments, at any desired point, any one or more of the involved INodes may notify the blockchain about respective BC check and/or digital wallet status changes (e.g., misplaced, lost, damaged, stolen, cashed out, floating, restored, etc.).

Figure 5:
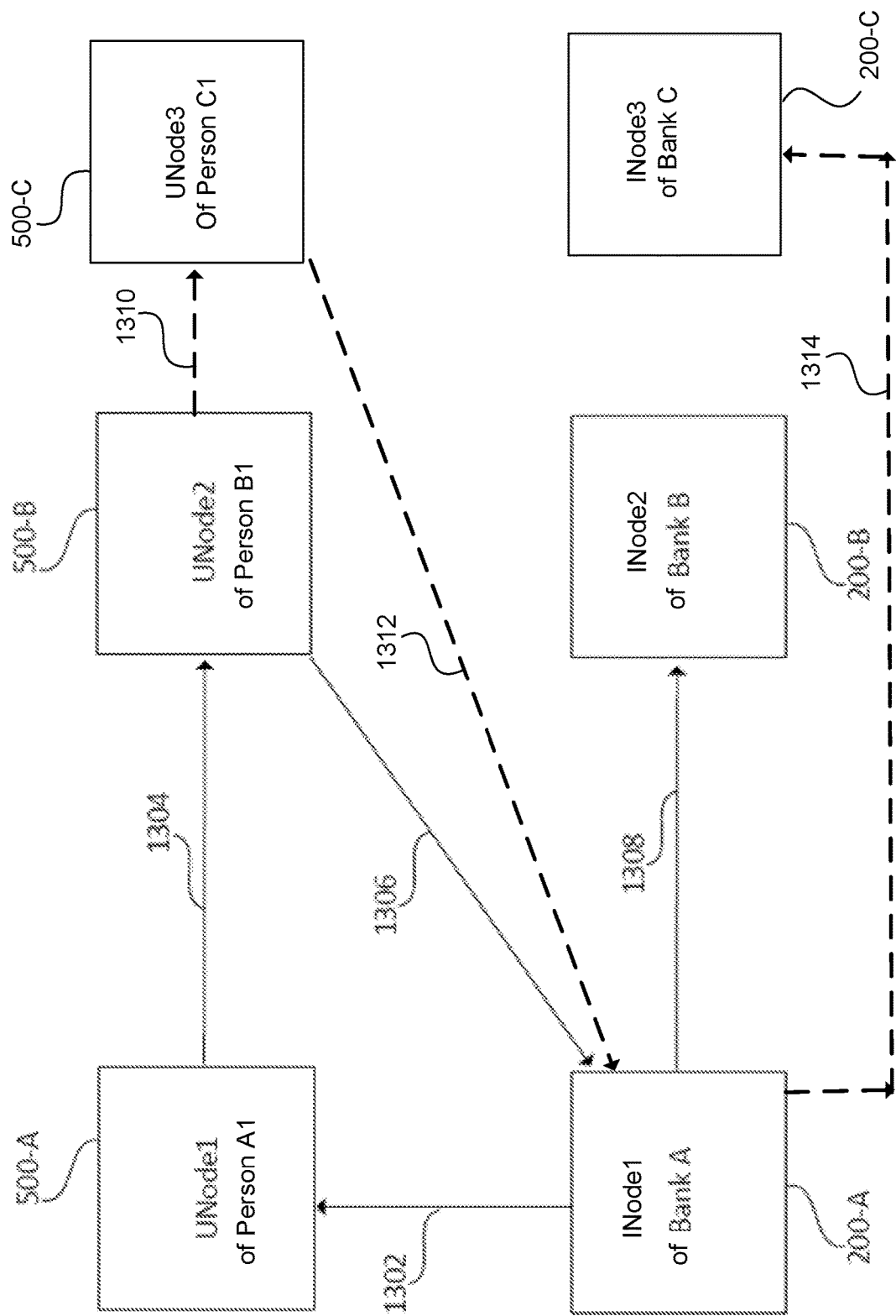
FIG. 5 is an operational flow diagram illustrating an example process that may be implemented in accordance with one or more embodiments of the present disclosure.

FIG. 5 provides an illustration that builds on the illustration provided in FIG. 4, depicting that as an alternative to cashing out the BC check as described in connection with FIG. 4, Person B1 may wish instead to use the BC check as the payment medium in a subsequent transaction, e.g., a transaction with Person C1. That is, instead of using UNode2 500-B to cash out the BC check by sending it, together with the Person B1 bank account details (e.g., Person B1's routing and account number at Bank B, or any other form of identification that corresponds to the Person B1's bank account wherein the deposit of fiat currency corresponding to the BC check is desired), to Bank A and/or its INode (INode1 200-A), Person B1 may use its UNode2 500-B to transfer the same BC check to UNode3 500-C as part of a new transaction between Person B1 and Person C1. That is, Person B1 may use the BC check it received from Person A1 (through their respective UNodes) to make a payment to Person C1 by, at least, sending the BC check from the digital wallet hosted in UNode2 500-B to the digital wallet hosted in UNode3 500-C (denoted by arrow 1310).

Thereafter, UNode3 500-C may either cash out the BC check or may use it as a form of payment to another network participant (e.g., Person D1), and so on with all subsequent network participants to are recipients of the BC Check. And in the event that any of the subsequent recipients wish to cash out the BC check, they may do so by the same process described in connection with FIG. 4. For example, if Person C1 wished to cash out the BC check, it may accomplish this by sending the BC check, together with the Person C1's bank account details (e.g., Person C1's routing and account number at Bank C, or any other form of identification that corresponds to the Person C1's bank account wherein the deposit of fiat currency corresponding to the BC check is desired), to Bank A and/or its INode (INode1 200-A). An example of such a cash out transmission is indicated by arrow 1312 (e.g., the BC check is sent from the digital wallet of UNode3 500-C to the INode1 200-A). Responsive to the operation denoted by arrow 1312, Bank A (via its INode or otherwise) may then transfer, directly or indirectly, the funds designated by the BC check to the bank account at Bank C (via its INode or otherwise) that corresponds to Person C1's bank account details. An example of such a transfer of funds from Bank A (via its INode or otherwise) to Bank C (via its INode or otherwise) for purposes of depositing such funds into the bank account at Bank C (via its INode or otherwise) that corresponds to Person C1's bank account details is denoted by arrow 1314 in FIG. 5. In some embodiments, Bank A (via its INode 200-A) will notify the blockchain hosted in whole or in part by INode 200-A of any and all of the steps in the foregoing process (e.g., of BC check approval/validation, of BC check generation, of BC check transfer, of BC check cash out, etc.). In some embodiments, Bank A (via its INode 200-A) may further notify the blockchain hosted in whole or in part by INode 200-A of any other occurrences that may interrupt the aforementioned process (e.g., of a lost status of a BC check, of a stolen status of a BC check, of a canceled action in connection with a BC check, etc.).

Figure 6:
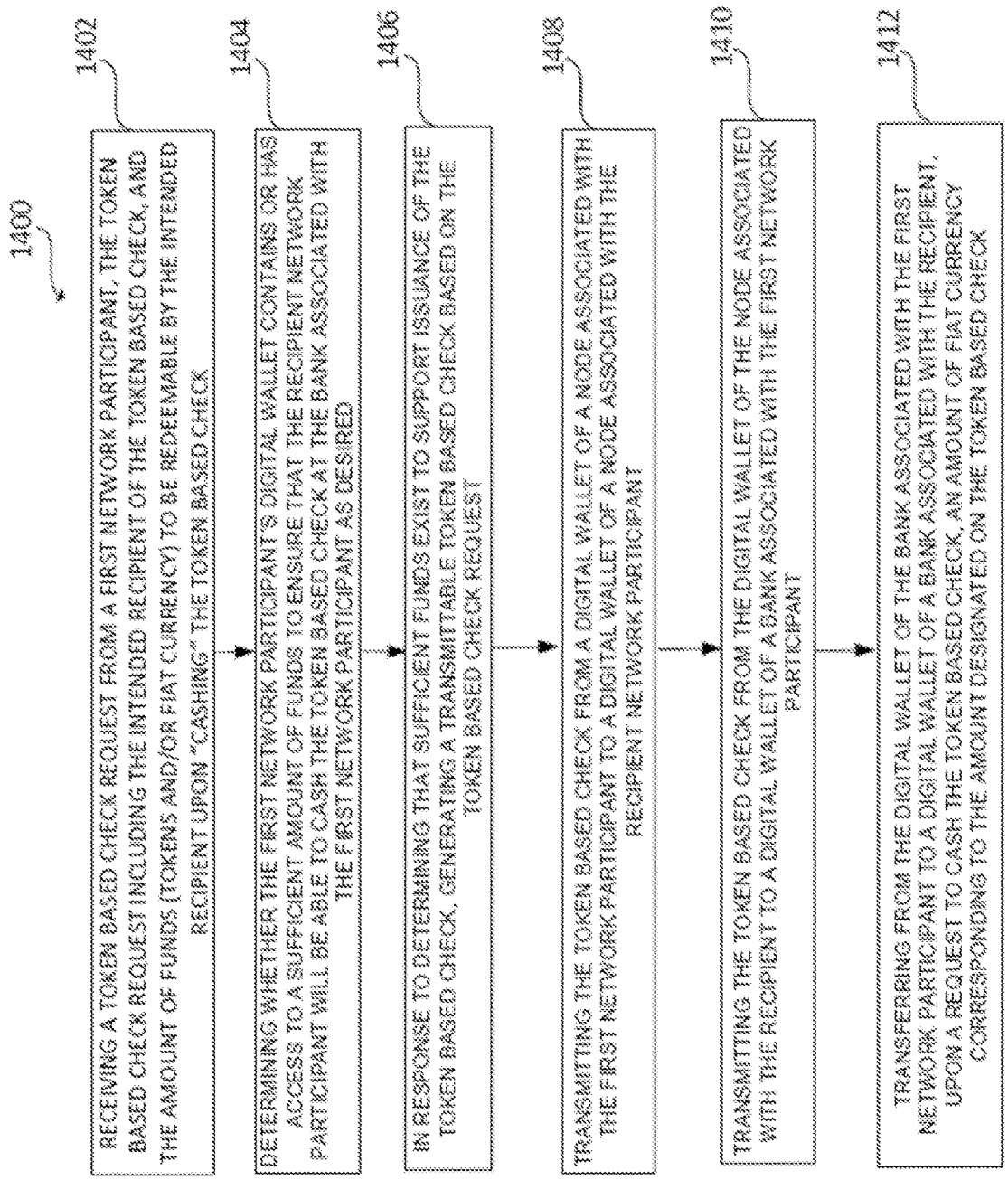
FIG. 6 is an operational flow diagram illustrating an example process that may be implemented in accordance with one or more embodiments of the present disclosure.

FIG. 6 illustrates an operational flow diagram illustrating an example method 1400 that may be implemented to in accordance with one or more embodiments of the present disclosure. At operation 1402, method 1400 comprises receiving a BC check request from a first network participant, the BC check request including the intended recipient of the BC check, and the amount of funds (e.g., digital currency and/or fiat currency) to be redeemable by the intended recipient upon cashing the BC check. At operation 1404, method 1400 comprises determining whether the first network participant has access to a sufficient amount of funds (whether via their associated bank account(s)) to ensure that the recipient network participant will be able to cash the BC check at the bank associated with the first network participant as desired. At operation 1406, method 1400 comprises, in response to determining that sufficient funds exist to support issuance of the BC check, generating a transmittable BC check based on the BC check request, and notifying a blockchain that such BC check has been generated. At operation 1408, method 1400 comprises transmitting the BC check from a node (e.g., from the digital wallet of such node) associated with the first network participant to a node (e.g., to the digital wallet of such node) associated with the recipient network participant. At operation 1410, method 1400 comprises transmitting or otherwise providing the BC check from the node (e.g., from the digital wallet of such node) associated with the recipient to a bank associated with the first network participant, whereupon the bank draws the funds called for in the BC check out of the account of the first network participant. At operation 1412, method 1400 comprises, upon a request to cash the BC check, transferring from the first network participant's account at the bank associated with the first network participant to the recipient network participant's account at the bank associated with the recipient network participant, an amount of funds (e.g. fiat currency) corresponding to the amount designated on the BC check.

While a number of the examples provided herein assume that the payee will always be a network participant that is registered into the blockchain networking environment in some capacity (e.g., registered with an INode as a non-account holding member, registered with an INode as an account holding member, etc., registered as a user within the digital wallet application). However, the systems and methods of the present disclosure may be adapted to accommodate unregistered members as well. For example, if a user of UNode 510 wants to transmit a BC check to a payee who is not a member of the blockchain transaction network, the user may, via a messaging interface, send payee a message (e.g., via email, SMS, chat, or otherwise) notifying the payee that the payer would like to transfer to them a BC check which they can cash out at the payer's bank (e.g., the issuing bank associated with the INode the corresponds to the payer's bank accounts). The message may include information or a link that enables the payee to register with the blockchain (e.g., by becoming a non-account holding member of a banking organization that is a member of the blockchain (which may be the issuing bank associated with the INode the corresponds to the payer's bank accounts)). Part of this registration may involve downloading a digital wallet app, and/or providing the payee's bank account information where the funds should be sent upon cashing out the BC check, and/or submitting any one or more other details (e.g., authentication details, name, address, identification, social security number, etc.) requested by the blockchain itself or the banking institution with whom the payee elects to sign up for a non-account holding membership. Part of this registration process may involve the payee logging in to their own bank account for validation purposes, and further to provide added layer of trust before the issuing bank sends the BC Check funds to the payee's bank account. In some embodiments, upon being notified of the blockchain transaction network and the parties that are members of such blockchain transaction network, the payee may recognize the benefits of the network and also elect to sign up for a bank account with one or more of the member banks such that it may not only receive and cash out the BC Check, but may then also benefit from the ability to write and send BC checks like the one they just received. Once registered with the blockchain, either as an account holding member or a non-account holding member, the payee may then receive the BC check at their new UNode device (e.g. the smartphone they just used to download the digital wallet app, login to their bank account, and/or register with the blockchain transaction network) and cash it out (e.g., send it to the INode of the issuing bank and receive the funds into its designated account).

Among other benefits, a person of ordinary skill in the art will appreciate that the BC checking systems and methods disclosed herein may avoid double spending, bounced checks, provide a simpler clearing process, enable quicker payments and lower processing costs, enable the cancelation and replacement of "lost checks" at more affordable rates, and altogether avoid the need for paper check printing and mailing.

Figure 7:
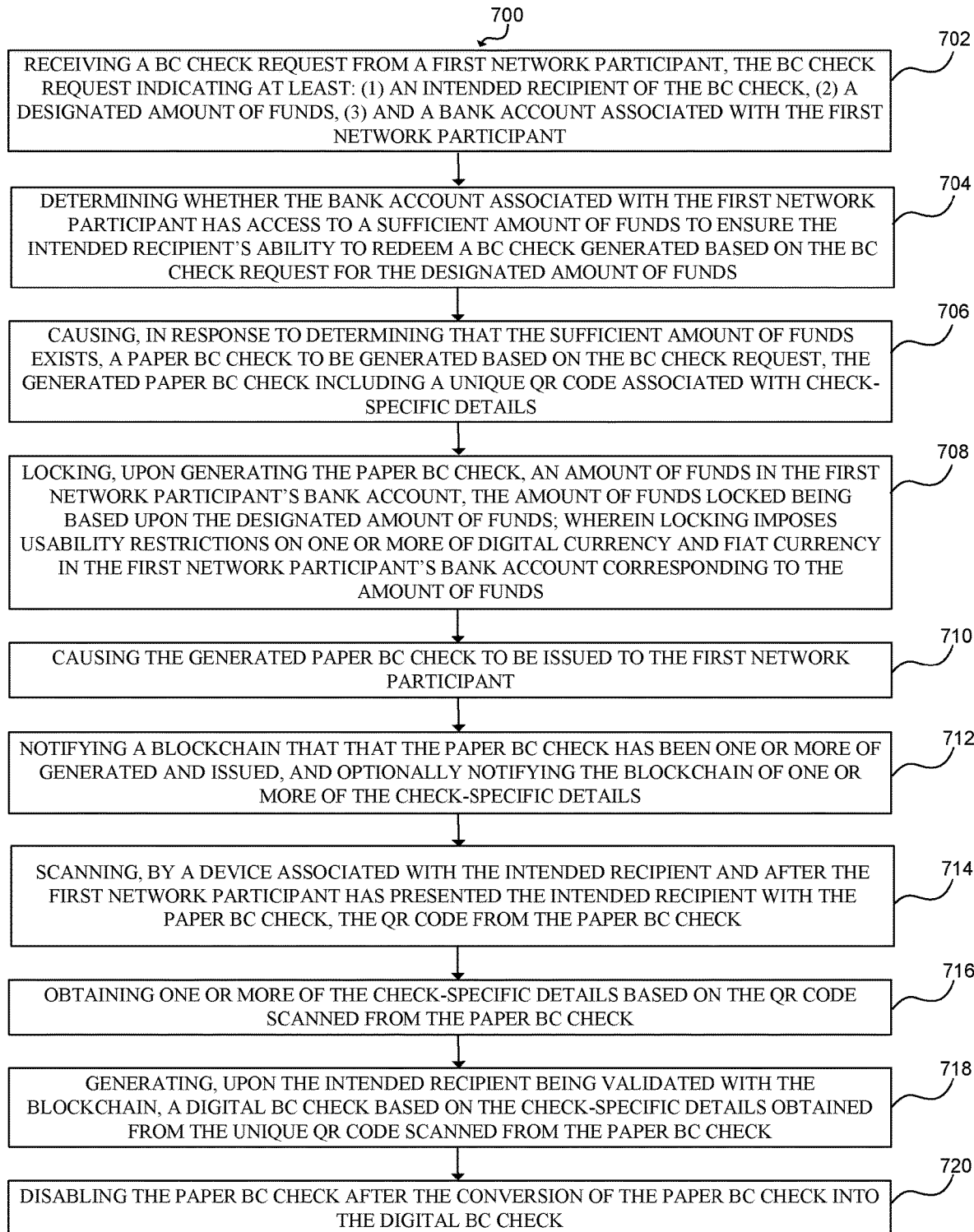
FIG. 7 is an operational flow diagram illustrating an example process that may be implemented in accordance with one or more embodiments of the present disclosure.
Figure 8:
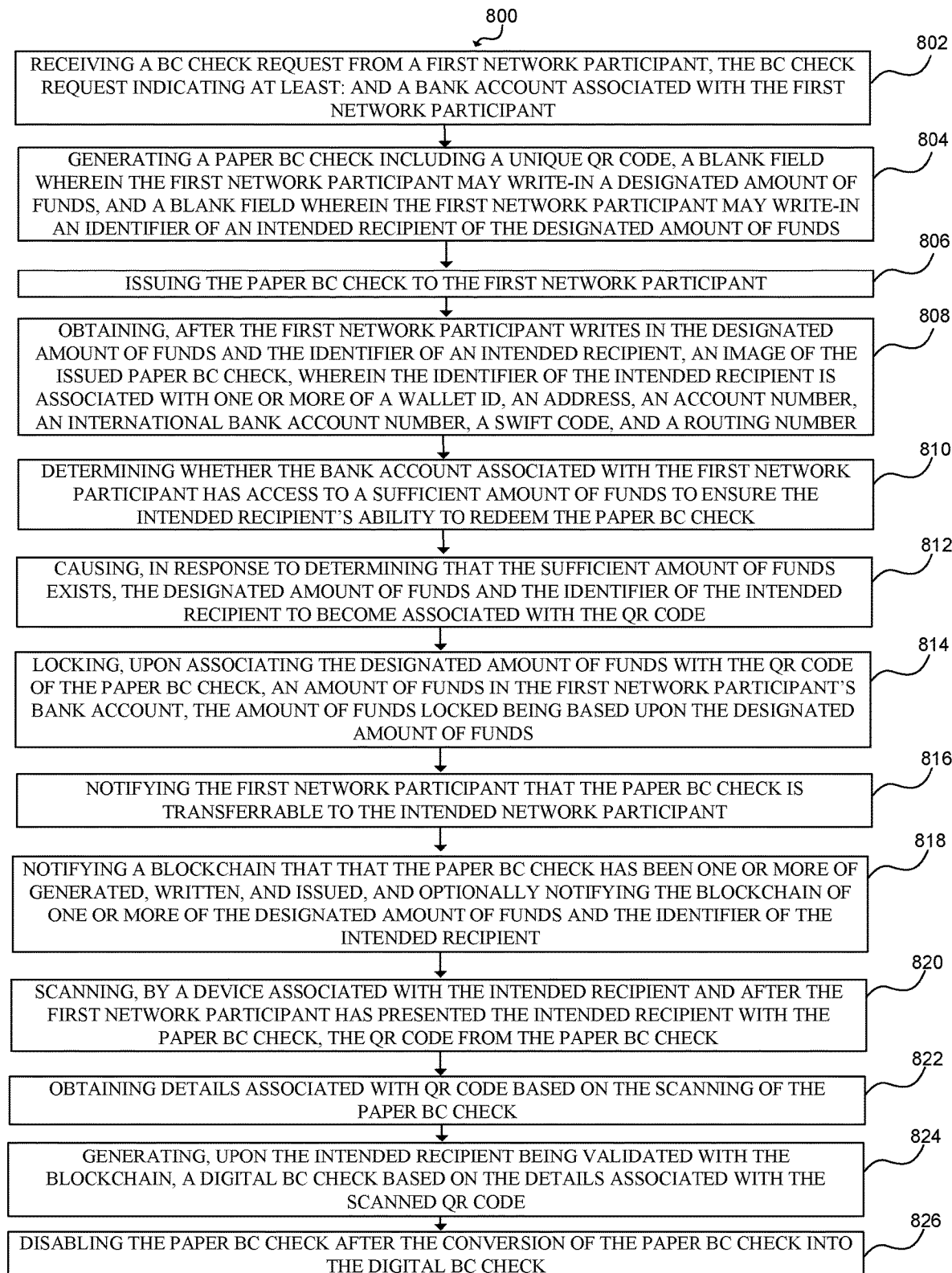
FIG. 8 is an operational flow diagram illustrating an example process that may be implemented in accordance with one or more embodiments of the present disclosure.

In some embodiments, however, even paper check platforms may be improved by elements of the technology disclosed herein. FIGS. 7 and 8 illustrate example methods for paper based BC checks that may be utilized in commerce with enhanced security features and/or be converted into a digital form of BC check and used as disclosed in any of the other embodiments of the present disclosure. The example methods of FIGS. 7 and 8 illustrate methods that may be implemented by any one or more of the systems, components, and/or elements presented in accordance with one or more embodiments of the present disclosure.

As shown in method 700 of FIG. 7, at operation 702, method 700 (which may be effectuated by one or more of the systems, components, and/or elements disclosed herein) comprises receiving a BC check request from a first network participant (e.g., a payer), the BC check request indicating at least: (1) an intended recipient (e.g., a payee) of the BC check, (2) a designated amount of funds, (3) and a bank account associated with the first network participant. The designated amount of funds may include the amount of digital currency or fiat currency that the first network participant intends to transfer to the intended recipient.

At operation 704, method 700 comprises determining whether the bank account associated with the first network participant has access to a sufficient amount of funds to ensure the intended recipient's ability to redeem a BC check generated based on the BC check request for the designated amount of funds. Determining whether there is a sufficient amount of funds may involve a validation by a blockchain hosted in whole or in part by the financial institution associated with the first network participant. The amount of funds may include digital currency or fiat currency or a combination of both.

At operation 706, method 700 comprises causing, in response to determining that the sufficient amount of funds exists, a paper BC check to be generated based on the BC check request, the generated paper BC check including a unique QR code associated with check-specific details. In some embodiments, the check specific details may include one or more of: a check number, a link to a downloadable digital wallet application, the designated amount of funds, an identifier associated with one or more of the first network participant and the intended recipient, an address associated with one or more of the first network participant and the intended recipient, a wallet ID associated with one or more of the first network participant and the intended recipient, a bank account detail associated with one or more of the first network participant and the intended recipient. In some embodiments, a bank account detail includes one or more of: an account number, an international bank account number, a swift code, and a routing number. In some embodiments, generating the paper BC check may include one or more of: printing a hard copy of a physical BC check on a paper medium (or some other physical medium), and/or creating an electronic file from which such a hard copy of a physical BC check may be printed on a paper medium (or some other physical medium).

At operation 708, method 700 comprises locking, upon generating the paper BC check, an amount of funds in the first network participant's bank account, the amount of funds locked being based upon the designated amount of funds. In some embodiments, locking may impose any type of usability/transferability restrictions on one or more of digital currency and fiat currency in the first network participant's bank account corresponding to the amount of funds.

At operation 710, method 700 comprises causing the generated paper BC check to be issued to the first network participant. In some embodiments, issuing the generated paper BC check to the first network participant may include one or more of: mailing to or handing over to (e.g. at a bank branch) the first network participant a hard copy of a physical BC check that has been printed on a paper medium (or some other physical medium), and/or transmitting to the first network participant an electronic file from which a hard copy of a physical BC check may be printed on a paper medium (or some other physical medium).

At operation 712, method 700 comprises notifying a blockchain that that the paper BC check has been one or more of generated and issued, and optionally notifying the blockchain of one or more of the check-specific details.

At operation 714, method 700 comprises scanning, by a device associated with the intended recipient and after the first network participant has presented the intended recipient with the paper BC check, the QR code from the paper BC check. At operation 716, method 700 comprises obtaining one or more of the check-specific details based on the QR code scanned from the paper BC check. In some embodiments, the scanning is performed by a camera associated with the device of the intended recipient (e.g., a UNode). In some embodiments, the camera associated with the device of the intended recipient is embodied in a point-of-sale device. In some embodiments, the camera associated with the device of the intended recipient is embodied within the device of the intended recipient (e.g., embodied within a UNode).

At operation 718, method 700 comprises generating, upon the intended recipient being validated with the blockchain, a digital BC check based on the check-specific details obtained from the unique QR code scanned from the paper BC check. Some embodiments may further involve notifying the blockchain that the paper BC check issued to the first network participant has been converted into a digital BC check by the digital wallet associated with the intended recipient At operation 720, method 700 comprises disabling the paper BC check after the conversion of the paper BC check into the digital BC check.

Although not explicitly shown in FIG. 7, in some embodiments, the systems and methods of the present disclosure may further include causing transmission of the digital BC check from the digital wallet of the node associated with the intended recipient to a financial institution associated with the first network participant, causing the transmission of one or more of the obtained check-specific details to the financial institution associated with the first network participant, and causing a transfer, based on the one or more check-specific details, of the designated amount of funds from the bank account at the financial institution associated with the first network participant to the bank account at the financial institution associated with the intended recipient.

Additionally, although not explicitly shown in FIG. 7, in some embodiments the systems and methods of the present disclosure may further include causing transmission, upon selection by the intended recipient, the digital BC check from a digital wallet associated with the intended recipient to a digital wallet associated with a second recipient network participant.

In some embodiments, the intended recipient may be validated with the blockchain, including by performing an authorization operation, wherein the authorization operation includes an evaluation of at least one of: a password, a code, a PIN, a two factor authentication mechanism, a handwriting sample, a handwritten signature, a digital signature, and a biometric measurement.

Additionally, although not explicitly shown in FIG. 7, in some embodiments the systems and methods of the present disclosure may further include determining whether the intended recipient is a member of a blockchain network associated with the first network participant's financial institution. If it is determined that the intended recipient is not a member of the blockchain network and in response the intended recipient scanning the QR code of the paper BC check, the intended recipient may be presented with an option to download a digital wallet application and register as a member of the blockchain network. Upon selection of the option presented to the intended recipient, the digital wallet application to be caused to be downloaded to the intended recipient's device. Upon download of the digital wallet application to the intended recipient's device, the intended recipient may be permitted to register as a member of the blockchain network for purposes of redeeming the digital BC check.

Referring now to FIG. 8, FIG. 8 is an operational flow diagram illustrating an example process that may be implemented in accordance with one or more embodiments of the present disclosure.

At operation 802, method 800 (which may be effectuated by one or more of the systems, components, and/or elements disclosed herein) comprises receiving a BC check request from a first network participant (e.g., from a payer sending a request, for instance, through their UNode), the BC check request indicating at least: and a bank account associated with the first network participant.

At operation 804, method 800 comprises generating a paper BC check including a unique QR code, a blank field wherein the first network participant may write-in a designated amount of funds, and a blank field wherein the first network participant may write-in an identifier of an intended recipient of the designated amount of funds. The QR code may be associated with one or more of: a check number, a link to a downloadable digital wallet application, an identifier associated with the first network participant, an address associated with the first network participant, a wallet ID associated with the first network participant, a bank account detail associated with the first network participant. A bank account detail may include one or more of: an account number, an international bank account number, a swift code, and a routing number.

At operation 806, method 800 comprises issuing the paper BC check to the first network participant. In some embodiments, issuing the generated paper BC check to the first network participant may include one or more of: mailing to the first network participant a hard copy of a physical BC check that has been printed on a paper medium (or some other physical medium), and/or transmitting to the first network participant an electronic file from which a hard copy of a physical BC check may be printed on a paper medium (or some other physical medium).

At operation 808, method 800 comprises obtaining, after the first network participant writes in the designated amount of funds and the identifier of an intended recipient, an image of the issued paper BC check, wherein the identifier of the intended recipient is associated with one or more of a wallet ID, an address, an account number, an international bank account number, a swift code, and a routing number. Obtaining the image may be accomplished via a camera component operatively coupled to the first network participant's UNode device, for example.

At operation 810, method 800 comprises determining whether the bank account associated with the first network participant has access to a sufficient amount of funds to ensure the intended recipient's ability to redeem the paper BC check. Determining whether there is a sufficient amount of funds may involve a validation by a blockchain hosted in whole or in part by the financial institution associated with the first network participant. The amount of funds may include digital currency or fiat currency or a combination of both.

At operation 812, method 800 comprises causing, in response to determining that the sufficient amount of funds exists, the designated amount of funds and the identifier of the intended recipient to become associated with the QR code.

At operation 814, method 800 comprises locking, upon associating the designated amount of funds with the QR code of the paper BC check, an amount of funds in the first network participant's bank account, the amount of funds locked being based upon the designated amount of funds. In some embodiments, locking may impose any type of usability/transferability restrictions on one or more of digital currency and fiat currency in the first network participant's bank account corresponding to the amount of funds.

At operation 816, method 800 comprises notifying the first network participant that the paper BC check is transferrable to the intended network participant. At operation 818, method 800 comprises notifying a blockchain that that the paper BC check has been one or more of generated, written, and issued, and optionally notifying the blockchain of one or more of the designated amount of funds and the identifier of the intended recipient. At operation 820, method 800 comprises scanning, by a device associated with the intended recipient and after the first network participant has presented the intended recipient with the paper BC check, the QR code from the paper BC check. At operation 822, method 800 comprises obtaining details associated with QR code based on the scanning of the paper BC check. At operation 824, method 800 comprises generating, upon the intended recipient being validated with the blockchain, a digital BC check based on the details associated with the scanned QR code. At operation 826, method 800 comprises disabling the paper BC check after the conversion of the paper BC check into the digital BC check, and optionally notifying the blockchain of such change status.

Although not explicitly shown in FIG. 8, in some embodiments, the systems and methods of the present disclosure may further include causing transmission of the digital BC check from the digital wallet of the node associated with the intended recipient to a financial institution associated with the first network participant, causing the transmission of one or more of the obtained details associated with the scanned QR code to the financial institution associated with the first network participant, and causing a transfer, based on the one or more details associated with the scanned QR code, of the designated amount of funds from the bank account at the financial institution associated with the first network participant to the bank account at the financial institution associated with the intended recipient.

Additionally, although not explicitly shown in FIG. 8, in some embodiments the systems and methods of the present disclosure may further include causing transmission, upon selection by the intended recipient, the digital BC check from a digital wallet associated with the intended recipient to a digital wallet associated with a second recipient network participant.

In some embodiments, the intended recipient may be validated with the blockchain, including by performing an authorization operation, wherein the authorization operation includes an evaluation of at least one of: a password, a code, a PIN, a two factor authentication mechanism, a handwriting sample, a handwritten signature, a digital signature, and a biometric measurement.

Additionally, although not explicitly shown in FIG. 8, in some embodiments the systems and methods of the present disclosure may further include determining whether the intended recipient is a member of a blockchain network associated with the first network participant's financial institution. If it is determined that the intended recipient is not a member of the blockchain network and in response the intended recipient scanning the QR code of the paper BC check, the intended recipient may be presented with an option to download a digital wallet application and register as a member of the blockchain network. Upon selection of the option presented to the intended recipient, the digital wallet application to be caused to be downloaded to the intended recipient's device. Upon download of the digital wallet application to the intended recipient's device, the intended recipient may be permitted to register as a member of the blockchain network for purposes of redeeming the digital BC check.

With reference to any one or more of the embodiments discussed and illustrated in connection with FIGS. 7-8, one or more elements of the disclosed systems (or components of the elements of the disclosed systems) may, alone or together, be configured to, or may cause one or more other elements of the disclosed systems (or components of the elements of the disclosed systems) to execute one or more commands to effectuate the methods disclosed herein.

With reference to any one or more of the embodiments discussed and illustrated in connection with FIGS. 1-8, one or more elements of the disclosed systems (or components of the elements of the disclosed systems) may, alone or together, cause one or more other elements of the disclosed systems (or components of the elements of the disclosed systems) to be updated to reflect new information, including the blockchain update itself to reflect any changes, updates, or other relevant information in connection with BC checks. For example, upon generating a BC Check based on input from a user of an UNode, one or more of the UNode and/or the INode corresponding to the issuing bank may update one or more other components of the system (e.g., the blockchain) that the BC check status is, for example, "written but not yet transferred." In another example, upon a BC check being transferred from the digital wallet of a payer's UNode to the digital wallet of a payee's UNode, one or more of the UNode and/or the INode corresponding to the issuing bank may update one or more other components of the system (e.g., the blockchain) that the BC check status is, for example, "written and transferred." In another example, after the blockchain records the BC check transfer from a payer's digital wallet into a payee's digital wallet, the blockchain may notify the INode associated with the issuing bank that the "checkholder" has changed from the payer to the payee. Many other examples of updates and notifications may be accomplished by the technology of the present disclosure. For brevity, it should be understood that any and all events that occur in connection with the BC checks of the present disclosure, from check issuance to the final cashing (or other terminating) event, may be notified, updated, and/or recorded to any one or more elements of the disclosed systems (or components of the elements of the disclosed systems) by, alone or together, any of the other one or more other elements of the disclosed systems (or components of the elements of the disclosed systems).

Also with reference to any one or more of the embodiments discussed and illustrated in connection with FIGS. 1-8, one or more elements of the disclosed systems (or components of the elements of the disclosed systems) may, alone or together, require an authentication (e.g., password, biometric, multi-factor authentication, etc.) before permitting any one or more processes to be initiated and/or otherwise accomplished as described herein. For example, before allowing a user to open and/or use the digital wallet application on his/her UNode device, an authentication may be required (e.g., by the UNode device, by the digital wallet application itself, etc.). In another example, before generating a BC Check based on input from a user of an UNode, an authentication may be required (e.g., by the UNode device, by the digital wallet application itself, etc.). In another example, before generating a BC Check above a particular amount (e.g., based on input from a user of an UNode), an authentication may be required (e.g., by the UNode device, by the digital wallet application itself, etc.). In another example, before allowing a BC Check to be sent from one digital wallet to another, an authentication may be required (e.g., by the sending UNode device, by the sender's digital wallet application itself, etc.). In another example, before allowing a BC Check to be received by a digital wallet, an authentication may be required (e.g., by the recipient's UNode device, by the recipient's digital wallet application itself, etc.). In another example, before allowing a payee to cash out a BC Check through the issuing bank (e.g., by sending the BC check to the issuing bank's INode), an authentication may be required (e.g., by the recipient's UNode device, by the recipient's digital wallet application itself, etc.). Many other points throughout the processes disclosed herein may involve an authentication stage. For brevity, it should be understood that any and all events that occur in connection with the BC checks of the present disclosure, from check issuance to the final cashing (or other terminating) event, may be made to occur only upon one or more users clearing one or more authentication steps. Any one or more of these authentication steps may be based, for example, on an evaluation of inputted or obtained real-time information (e.g., a password, a biometric measure) in comparison to data stored in another element of the systems disclosed herein (e.g., in an INode, a UNode, the blockchain, a digital wallet app, in an external resource, etc.). In this way, multi-level security, privacy, and control may be maintained.

Figure 9:
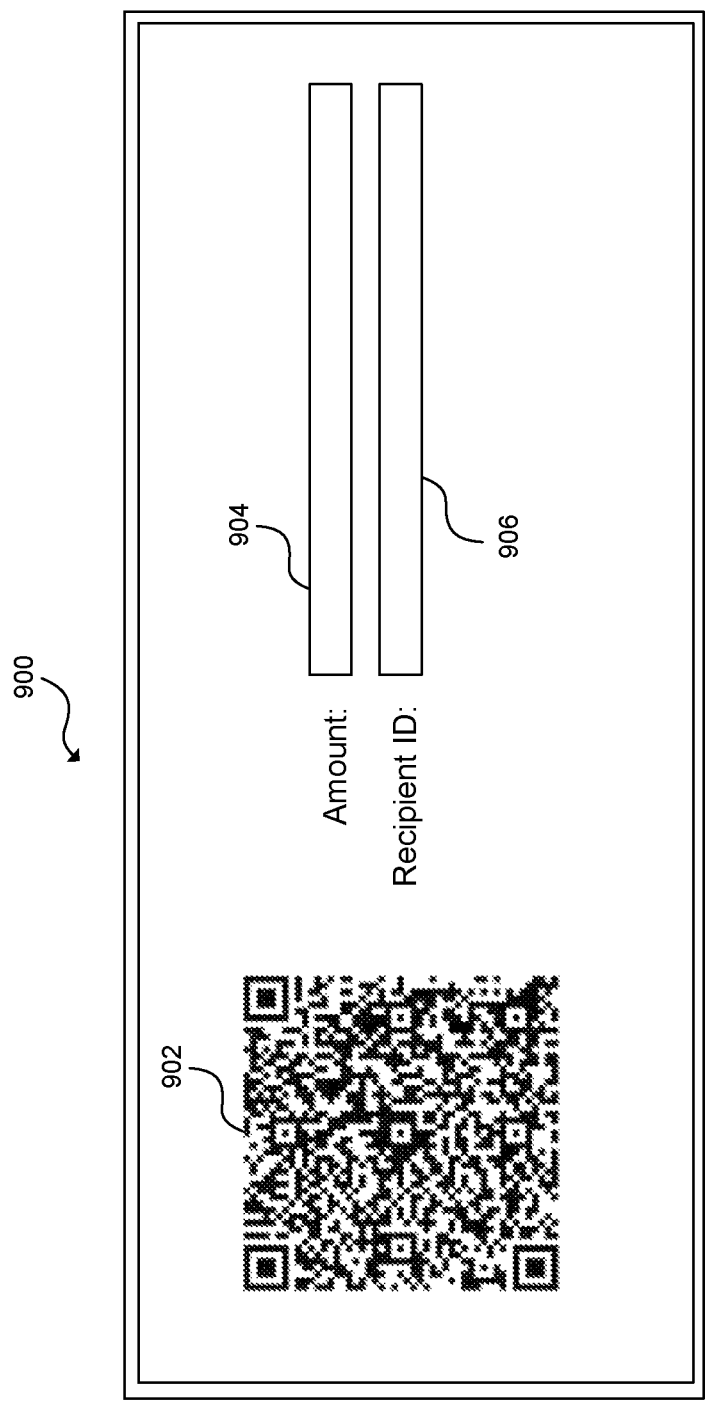
FIG. 9 is a symbolic illustration of an example paper BC check in accordance with one or more embodiments of the present disclosure.

FIG. 9 is a symbolic illustration of an example paper BC check generated in accordance with one or more embodiments of the present disclosure. As shown, paper BC check 900 may include a unique QR code 902, a blank field 904 where a payer (e.g., a first network participant, i.e., the network participant to whom the bank issued the check) may write-in a designated amount of funds, and a blank field 906 where the payer may write-in an identifier of a payee (e.g., the intended recipient) of the designated amount of funds. As noted elsewhere herein, the QR code may be associated with one or more of: a check number, a link to a downloadable digital wallet application, an identifier associated with the first network participant, an address associated with the first network participant, a wallet ID associated with the first network participant, a bank account detail associated with the first network participant. In some embodiments, a bank account detail includes one or more of: an account number, an international bank account number, a swift code, and a routing number.

Alternatively or additionally, any other code or coding mechanism may be utilized in place of or in addition to the QR code. For example, a barcode, an RFID chip, a magnetic strip, or any other information encodable unit, symbol, or object may be utilized in the same manner as the QR codes described herein. In some embodiments, a paper BC check may include more than one of the foregoing types of information encodable units for enhanced security, privacy, and authentication mechanisms.

In some embodiments, instead of providing blank fields 904, 906 directly on the paper BC check itself for the payer to write-in, the paper BC check may include no fields at all, and instead the payer may scan the QR code with his/her UNode device (or other scanning device associated therewith) and provide/enter the relevant details (i.e., the designated amount, the identifier of a payee) via the digital wallet associated with their UNode. Once entered, the systems of the present disclosure may communicate/notify the entered information to one or more of the financial institution that issued the paper BC check and/or the blockchain hosted in whole or in part by the financial institution that issued the paper BC check, which may then associate the entered information with the unique QR code of the paper BC check.

In some embodiments, a payer may utilize its digital wallet of its UNode to associate information with an already-printed QR code in real-time (or near real-time) such that the user can effectively write a paper BC check having a QR code on-the-fly whenever needed.

Figure 10:
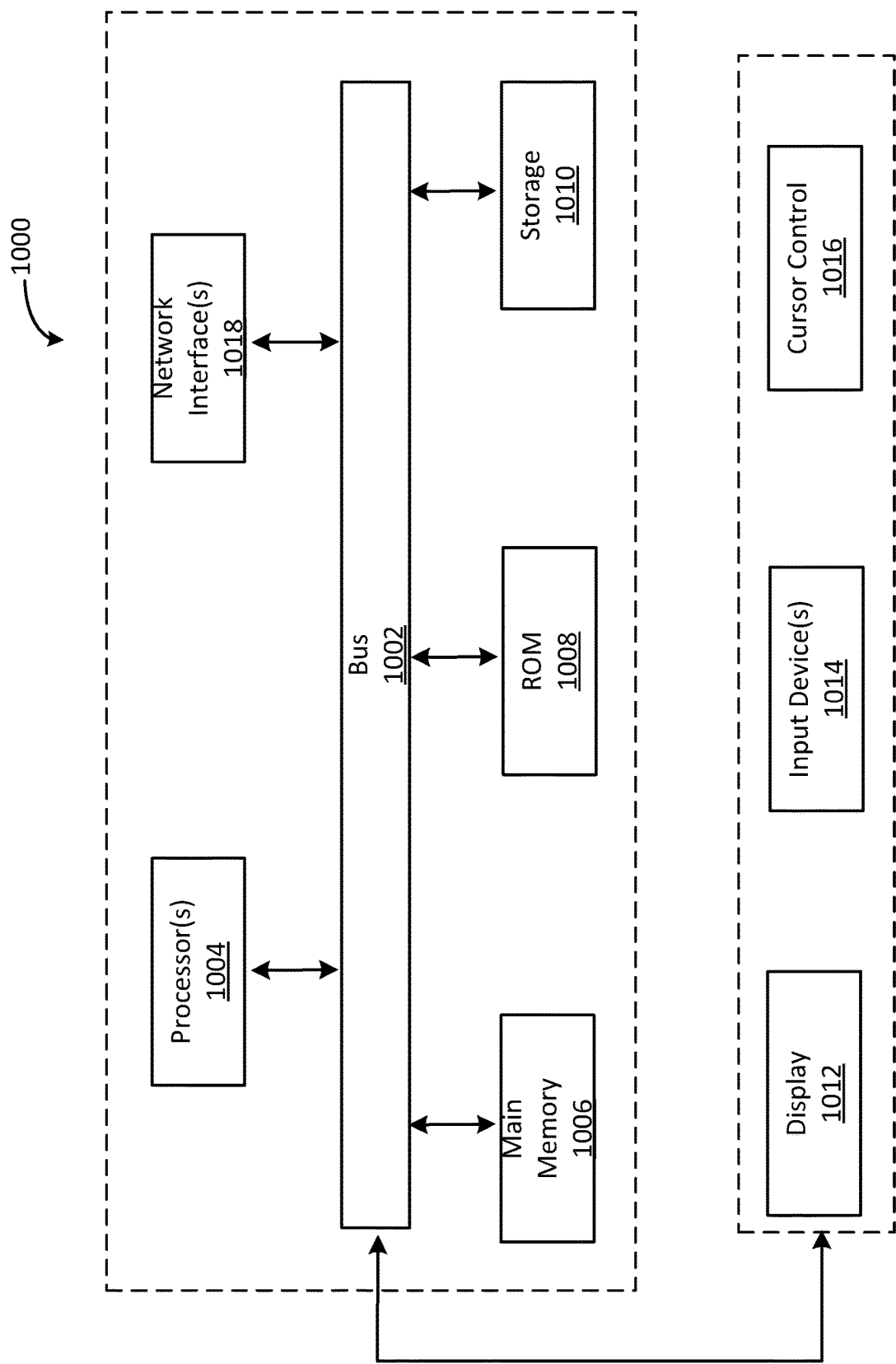
FIG. 10 is an example computing device that may be used to implement various features of embodiments described in the present disclosure.

FIG. 10 depicts a block diagram of an example computer system 1000 in which various of the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions. For enhanced security, in some embodiments storage at a UNode is embodied in ROM only.

The computer system 1000 may be coupled via bus 1002 to a display 1012, such as a liquid crystal display (LCD) (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. In some embodiments, the same direction information and command selections as cursor control may be implemented via receiving touches on a touch screen without a cursor.

The computing system 1000 may include a user interface component to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++, GoLang. A software component may be compiled and linked into an executable program, installed in a dynamic link library, or may be written in an interpreted programming language such as, for example, BASIC, Perl, or Python, GoLang. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

The computer system 1000 also includes a communication interface 1018 coupled to bus 1002. Network interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, network interface 1018 may be a local area network (LAN) card to provide a data communication connection to a compatible LAN (or WAN component to communicated with a WAN). Wireless links may also be implemented. In any such implementation, network interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network(s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Although examples of the present disclosure have been provided with respect to digital currency issued by a central bank (e.g., CBDC), the technology of the present disclosure also extends to tokens issued by private entities more generally. As such, for each discussion and reference to "digital currency" in the present disclosure, the same should be understood to be applicable to the context where privately issued tokens (which may be pegged to fiat-currency at a predetermined exchange rate) are utilized.

For purposes of description the present disclosure has been explained in terms of two network participants (a payer and a payee) transacting in a blockchain supported transaction environment. It should be understood however that the examples provided herein should not be understood to limit the present disclosure to such embodiments. For instance, in implementations of the present technology that support transactions between more than two parties in a single transaction (e.g., a three party transaction, a five party transaction, an N-party transaction)

It should further be understood that the various embodiments of the present disclosure are not limited to a particular blockchain consensus protocol. Indeed, by way of example only, the consensus protocol employed in connection with the blockchain used to validate BC checks of the present disclosure may include one or more of a Proof of Two consensus protocol, Proof of N consensus protocol, Proof of Authority consensus protocol, Proof of History consensus protocol, Proof of Stake consensus protocol, Proof of Work consensus protocol, and/or any other consensus protocols that may be developed in the future.

Although various embodiments of the present disclosure are discussed herein in the context of blockchains, it should be understood that all such embodiments can be equally applied to any type of distributed ledger technologies, regardless of the syntax used to label the same, or any modifications or variations thereon. For example, to the extent an embodiment is described in the context of a blockchain supported transaction network, it should be appreciated that the embodiment may more generally be applied in a distributed ledger supported transaction network.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system comprising:
one or more processors; and
one or more memory devices storing instructions that, when executed by the one or more processors, cause the system to perform operations of:
receiving a BC (blockchain) check request from a first network participant, the BC check request indicating at least a bank account associated with the first network participant;
generating a paper BC check including a unique QR code, a blank field wherein the first network participant may write-in a designated amount of funds, and a blank field wherein the first network participant may write-in an identifier of an intended recipient of the designated amount of funds; wherein the QR code is associated with one or more of: a check number, a link to a downloadable digital wallet application, an identifier associated with the first network participant, an address associated with the first network participant, a wallet ID associated with the first network participant, and a bank account detail associated with the first network participant; wherein a bank account detail includes one or more of: an account number, an international bank account number, a swift code, and a routing number;
issuing the paper BC check to the first network participant;
obtaining, after the first network participant writes in the designated amount of funds and the identifier of an intended recipient, an image of the issued paper BC check, wherein the identifier of the intended recipient is associated with one or more of a wallet ID, an address, an account number, an international bank account number, a swift code, and a routing number;
determining whether the bank account associated with the first network participant has access to a sufficient amount of funds to ensure the intended recipient's ability to redeem the paper BC check;
causing, in response to determining that the sufficient amount of funds exists, the designated amount of funds and the identifier of the intended recipient to become associated with the QR code;
locking, upon associating the designated amount of funds with the QR code of the paper BC check, an amount of funds in the first network participant's bank account, the amount of funds locked being based upon the designated amount of funds; wherein locking imposes usability restrictions on one or more of digital currency and fiat currency in the first network participant's bank account corresponding to the amount of funds;
notifying the first network participant that the paper BC check is transferrable to the intended network participant;
notifying a blockchain that the paper BC check has been one or more of generated, written, and issued, and optionally notifying the blockchain of one or more of the designated amount of funds and the identifier of the intended recipient;
scanning, by a device associated with the intended recipient and after the first network participant has presented the intended recipient with the paper BC check, the QR code from the paper BC check;
obtaining details associated with the QR code based on the scanning of the paper BC check;
generating, upon the intended recipient being validated with the blockchain, a digital BC check based on the details associated with the scanned QR code;
disabling the paper BC check after the conversion of the paper BC check into the digital BC check.

2. The system of claim 1, wherein the one or more memory devices store instructions that, when executed by the one or more processors, further cause the system to perform operations of:

transmitting the digital BC check from the digital wallet of the node associated with the intended recipient to a financial institution associated with the first network participant;

transmitting one or more of the details associated with the scanned QR code to the financial institution associated with the first network participant;

transferring, based on the one or more details associated with the scanned QR code, the designated amount of funds from the bank account at the financial institution associated with the first network participant to the bank account at the financial institution associated with the intended recipient.

3. The system of claim 1, wherein the one or more memory devices store instructions that, when executed by the one or more processors, further cause the system to perform operations of:

transmitting, upon selection by the intended recipient, the digital BC check from a digital wallet associated with the intended recipient to a digital wallet associated with a second recipient network participant.

4. The system of claim 2, wherein the designated amount of funds includes one or more of an amount of digital currency and an amount of fiat-currency.

5. The system of claim 1, wherein the one or more memory devices store instructions that, when executed by the one or more processors, further cause the system to perform operations of:

notifying the blockchain that the paper BC check issued to the first network participant has been converted into a digital BC check by the digital wallet associated with the intended recipient.

6. The system of claim 1, wherein the intended recipient is validated with the blockchain by performing an authorization operation, wherein the authorization operation includes an evaluation of at least one of: a handwriting sample, a handwritten signature, a digital signature, and a biometric measurement.

7. The system of claim 1, wherein the one or more memory devices store instructions that, when executed by the one or more processors, further cause the system to perform operations of:

determining whether the intended recipient is a member of a blockchain network associated with the first network participant's financial institution;

presenting, if it is determined that the intended recipient is not a member of the blockchain network and in response the intended recipient scanning the QR code of the paper BC check, the intended recipient with an option to download a digital wallet application and register as a member of the blockchain network;

causing, upon selection of the option presented to the intended recipient, the digital wallet application to be downloaded to the intended recipient's device;

permitting, upon download of the digital wallet application to the intended recipient's device, the intended recipient to register as a member of the blockchain network for purposes of redeeming the digital BC check.

8. The system of claim 1, wherein the scanning is performed by a camera associated with the device of the intended recipient.

9. The system of claim 8, wherein the camera associated with the device of the intended recipient is embodied in a point-of-sale device.

10. The system of claim 8, wherein the camera associated with the device of the intended recipient is embodied within the device of the intended recipient.

11. A method, comprising:

receiving a BC (blockchain) check request from a first network participant, the BC check request indicating at least a bank account associated with the first network participant;

generating a paper BC check including a unique QR code, a blank field wherein the first network participant may write-in a designated amount of funds, and a blank field wherein the first network participant may write-in an identifier of an intended recipient of the designated amount of funds; wherein the QR code is associated with one or more of: a check number, a link to a downloadable digital wallet application, an identifier associated with the first network participant, an address associated with the first network participant, a wallet ID associated with the first network participant, and a bank account detail associated with the first network participant; wherein a bank account detail includes one or more of: an account number, an international bank account number, a swift code, and a routing number;

issuing the paper BC check to the first network participant;

obtaining, after the first network participant writes in the designated amount of funds and the identifier of an intended recipient, an image of the issued paper BC check, wherein the identifier of the intended recipient is associated with one or more of a wallet ID, an address, an account number, an international bank account number, a swift code, and a routing number;

determining whether the bank account associated with the first network participant has access to a sufficient amount of funds to ensure the intended recipient's ability to redeem the paper BC check;

causing, in response to determining that the sufficient amount of funds exists, the designated amount of funds and the identifier of the intended recipient to become associated with the QR code;

locking, upon associating the designated amount of funds with the QR code of the paper BC check, an amount of funds in the first network participant's bank account, the amount of funds locked being based upon the designated amount of funds; wherein locking imposes usability restrictions on one or more of digital currency and fiat currency in the first network participant's bank account corresponding to the amount of funds;

notifying the first network participant that the paper BC check is transferrable to the intended network participant;

notifying a blockchain that the paper BC check has been one or more of generated, written, and issued, and optionally notifying the blockchain of one or more of the designated amount of funds and the identifier of the intended recipient;

scanning, by a device associated with the intended recipient and after the first network participant has presented the intended recipient with the paper BC check, the QR code from the paper BC check;

obtaining details associated with the QR code based on the scanning of the paper BC check;

generating, upon the intended recipient being validated with the blockchain, a digital BC check based on the details associated with the scanned QR code;

disabling the paper BC check after the conversion of the paper BC check into the digital BC check.

12. The method of claim 11, further comprising:
transmitting the digital BC check from the digital wallet of the node associated with the intended recipient to a financial institution associated with the first network participant;
transmitting one or more of the details associated with the scanned QR code to the financial institution associated with the first network participant;
transferring, based on the one or more details associated with the scanned QR code, the designated amount of funds from the bank account at the financial institution associated with the first network participant to the bank account at the financial institution associated with the intended recipient.

13. The method of claim 11, further comprising:
transmitting, upon selection by the intended recipient, the digital BC check from a digital wallet associated with the intended recipient to a digital wallet associated with a second recipient network participant.

14. The method of claim 12, wherein the designated amount of funds includes one or more of an amount of digital currency and an amount of fiat-currency.

15. The method of claim 11, further comprising:
notifying the blockchain that the paper BC check issued to the first network participant has been converted into a digital BC check by the digital wallet associated with the intended recipient.

16. The method of claim 11, wherein the intended recipient is validated with the blockchain by performing an authorization operation, wherein the authorization operation includes an evaluation of at least one of: a handwriting sample, a handwritten signature, a digital signature, and a biometric measurement.

17. The method of claim 11, further comprising:
determining whether the intended recipient is a member of a blockchain network associated with the first network participant's financial institution;
presenting, if it is determined that the intended recipient is not a member of the blockchain network and in response the intended recipient scanning the QR code of the paper BC check, the intended recipient with an option to download a digital wallet application and register as a member of the blockchain network;
causing, upon selection of the option presented to the intended recipient, the digital wallet application to be downloaded to the intended recipient's device;
permitting, upon download of the digital wallet application to the intended recipient's device, the intended recipient to register as a member of the blockchain network for purposes of redeeming the digital BC check.

18. The method of claim 11, wherein the scanning is performed by a camera associated with the device of the intended recipient.

19. The method of claim 18, wherein the camera associated with the device of the intended recipient is embodied in a point-of-sale device.

20. The method of claim 18, wherein the camera associated with the device of the intended recipient is embodied within the device of the intended recipient.

* * * * *